United States Patent [19]

Hareyama et al.

[11] Patent Number: 5,780,826
[45] Date of Patent: Jul. 14, 1998

[54] CONTAINER HANDLING APPARATUS AND MANAGEMENT SYSTEM

[75] Inventors: Soichi Hareyama, Abiko; Takao Serizawa; Hideki Hamada, both of Ushiku; Takayuki Ban, Ryugasaki, all of Japan

[73] Assignee: Toyo Umpanki Co., Ltd., Osaka, Japan

[21] Appl. No.: 750,474

[22] PCT Filed: Mar. 27, 1995

[86] PCT No.: PCT/JP95/00598

§ 371 Date: Dec. 16, 1996

§ 102(e) Date: Dec. 16, 1996

[87] PCT Pub. No.: WO96/30288

PCT Pub. Date: Oct. 3, 1996

[51] Int. Cl.⁶ .............. G06F 17/60; G06K 7/10; E04H 6/00; G01S 3/02
[52] U.S. Cl. .............. 235/385; 235/375; 235/454; 414/459; 414/460; 180/167; 342/457; 342/458
[58] Field of Search .............. 364/478.01; 414/459, 414/460, 273; 180/167, 168, 169; 235/375, 383, 384, 385, 454; 342/126, 457, 458

[56] References Cited

U.S. PATENT DOCUMENTS

| | | | |
|---|---|---|---|
| 3,952,891 | 4/1976 | Terayama et al. | 414/786 |
| 3,958,102 | 5/1976 | Burt | 414/273 |
| 3,958,106 | 5/1976 | Bedford et al. | 235/435 |
| 4,172,685 | 10/1979 | Nabeshima et al. | 414/140.3 |
| 4,455,483 | 6/1984 | Schonhuber | 235/385 |
| 4,636,950 | 1/1987 | Caswell et al. | 235/385 |
| 4,679,149 | 7/1987 | Merz | 364/478.14 |
| 4,750,197 | 6/1988 | Denekamp et al. | 235/385 |
| 4,783,740 | 11/1988 | Ishizawa et al. | 364/478.02 |
| 4,812,629 | 3/1989 | O'Neil et al. | 235/383 |
| 4,884,208 | 11/1989 | Marinelli et al. | 340/989 |
| 4,903,212 | 2/1990 | Yokouchi et al. | 364/571.01 |
| 4,973,219 | 11/1990 | Brickner et al. | 414/792.9 |
| 5,025,140 | 6/1991 | Varley | 235/385 |
| 5,216,618 | 6/1993 | Arita et al. | 235/385 |
| 5,303,214 | 4/1994 | Kulakowski et al. | 235/385 |
| 5,410,486 | 4/1995 | Kishi et al. | 340/990 |
| 5,565,858 | 10/1996 | Guthrie | 235/385 |
| 5,581,257 | 12/1996 | Greene et al. | 235/375 |
| 5,646,389 | 7/1997 | Bravman et al. | 235/385 |

FOREIGN PATENT DOCUMENTS

| | | |
|---|---|---|
| 61-69601(A) | 4/1986 | Japan. |
| 61-69602(A) | 4/1986 | Japan. |
| 61-69604(A) | 4/1986 | Japan. |
| 3-174608(A) | 7/1991 | Japan. |
| 3-174609(A) | 7/1991 | Japan. |
| 3-174610(A) | 7/1991 | Japan. |
| 5-20341(A) | 1/1993 | Japan. |
| 5-20342(A) | 1/1993 | Japan. |
| 5-20343(A) | 1/1993 | Japan. |
| 5-201506(A) | 2/1993 | Japan. |
| 5-201505(A) | 8/1993 | Japan. |
| 5-201604(A) | 8/1993 | Japan. |
| 5-208713(A) | 8/1993 | Japan. |
| 5-208714(A) | 8/1993 | Japan. |
| 5-208715(A) | 8/1993 | Japan. |

*Primary Examiner*—Donald T. Hajec
*Assistant Examiner*—Jacob Eisenberg
*Attorney, Agent, or Firm*—Oblon, Spivak, McClelland, Maier & Neustadt, P.C.

[57] ABSTRACT

A self-propelled container handling apparatus handles a container in a container yard. The container handling apparatus reads an identification code borne on the container and senses a position of the container to be handled. On the basis of the container identification code read by the container handling apparatus and the container position sensed by the container handling apparatus, the inventory data for the containers stored in the container yard are updated.

19 Claims, 14 Drawing Sheets

CONTAINER HANDLING APPARATUS AND MANAGEMENT SYSTEM

BACKGROUND OF THE INVENTION

1. Field of the Invention

The present invention relates to a container handling apparatus and management system for containers to be handled in a container yard.

2. Discussion of the Background

In a container yard, a large number of containers carried by trucks, vessels, and the like, are stocked. Each container bears a container identification code, which usually consists of alphanumeric characters. The identification codes and the stocking positions of the containers in the container yard are stored as inventory data in a computer of the main management room of the container yard.

For handling the containers scheduled to be carried in the container yard and those scheduled to be carried out from the container yard, a container handling work plan, including the identification codes and handling positions thereof, is prepared. According to the container handling work plan, instructions as to container handling work are given to the operator of a self-propelled container handling apparatus. The operator of the container handling apparatus perform container handling, after confirmation of the identification code of the container instructed. For example, the operator shifts a container unloaded from a truck to a stocking position in the container yard, loads a container at a stocking position in the container yard to a truck, shifts a container unloaded from a vessel to a stocking position in the container yard, or shifts a container stocked in the container yard to a container handling position of a handling apparatus for loading to a vessel. The above-described inventory data are updated upon reporting of completion of the container handling work from the operator of the container handling apparatus.

When plural containers are carried in the container yard by a vessel, the containers are once placed at random positions to shorten anchoring time of the vessel. The positions and the identification codes of the containers randomly placed are confirmed by a container yard worker. The randomly placed containers are then shifted to preset stocking positions by the container handling apparatus for martialing to enable efficient container delivery according to a truck delivery plan or the like.

When containers are carried out from the container yard by a vessel, martialing by the container handling apparatus is performed to arrange the containers in the order of loading to the vessel.

Since containers in the container yard are stacked, an upper container must be shifted to another place before a lower container is carried out in advance of the upper container. Such container shifting is usually achieved by the operator of the container handling apparatus in a container free shifting mode. To prevent the freely shifted upper container from being lost, the operator of the container handling apparatus must confirm the identification code and the stocking position of the upper container after the shifting.

When a container is carried in, and carried out from, the container yard via a gate by a truck or the like, its identity is confirmed based on the identification code by a worker at the gate.

Traditionally, the operator of the container handling apparatus and the worker of the container yard have confirmed container identification codes by visual inspection. That practice involves the possibility of erroneous reading of the container identification code. The erroneous reading of the container identification code affects the inventory data, which can result in the loss of the container in the huge container yard. If a container is lost, the positions and identification codes of a large number of containers must be re-confirmed, which requires vast labor and delays of the arrival of the containers at their destination. Also, the erroneous visual confirmation can lead to delivery of a wrong container to the destination.

When containers are carried in the container yard by a vessel, the positions and identification codes of the containers unloaded to random positions are visually confirmed by a container yard worker. If the confirmation work is performed after completion of the work of the container handling apparatus, the confirmation work is harsh because it continues till midnight.

For the container handling work in the container yard, verbal instructions are given by radio communication from the main management room. The inventory data of the container in the yard are updated upon verbal reporting by the radio communication from the operator of the container handling apparatus after completion of the container handling work by the container handling apparatus. To make such communications for the work instructions and the updating of the inventory data by the verbal communication, a large number of operators for information processing must be assigned to the main management room of the container yard.

In addition, an one-way instruction as to the container handling work is sometimes given from the manager to the operator of the container handling apparatus to ensure reliable management of the inventory data, which can lead to a harsh instruction for the operator of the container handling apparatus.

As a solution to the above-described problems, a container position sensing system has been proposed (Japanese Unexamined Patent Publication HEI No. 5-201504). This system comprises a self-propelled container handling apparatus; lane identifiers arranged at entrances of plural container stocking lanes in a container yard; a reader provided in the container handling apparatus to read information on the identifiers; an apparatus for sensing the self-propelling distance of the container handling apparatus; an apparatus for sensing the vertical shifting distance of the container vertically shifted by the container handling apparatus; and a controller for calculating the position of the container based on the read signal of the identifier, the sensed signal of the self-propelling distance of the container handling apparatus, and the sensed signal of the vertical shifting distance of the container. By data transmission of the sensed container position and the visually confirmed container identification code between the container handling apparatus and the main management room via a computer, inventory data are accumulated and updated, and a work instruction is given to the operator of the container handling apparatus. However, this system requires visual confirmation of the container identification code, although it is capable of sensing container positions. For this reason, there is a possibility that erroneous reading of the container identification code affects the inventory data and hampers container management, which can result in the loss of a container in the huge container yard. Moreover, since the system requires reading of the information on the identifier at the entrance of the container stocking lane, the container handling apparatus must pass the entrance of the container stocking lane. This restricts the free movement of the container handling apparatus, resulting in decreased work efficiency. Also, to change the lane layout in response to a change in the amount of containers to be handled in the container yard, or the like, a work for changing the arrangement of the identifiers in the huge container yard is necessary. Also, a method for sensing a position of a container to be handled is suggested, that is, the position of the self-propelled container handling apparatus can be determined by using signals from artificial satellites. However, even if the position of the container can be sensed, the container identification code must be visually confirmed. For this reason, there is a possibility that erroneous reading of a container identification code affects the inventory data, which can result in the loss of a container in the huge container yard.

There has also been proposed a searching system for finding a lost container (Japanese Unexamined Patent Publication HEI No. 6-24527). This system comprises a self-propelled container handling apparatus, identifiers attached to plural containers to permit identification of the plural containers respectively, a reader provided in the container handling apparatus to read the identifiers, a storage device for storing identification information of a container to be searched, means for checking the stored container identification information against the above-described information read from the identifiers, and means for outputting the checking result. However, this system is incapable of sensing container positions. Therefore, it is impossible to prevent the containers from being lost, impossible to confirm the positions of the containers placed at random positions, and impossible to manage the inventory data on a real-time basis during container handling.

An image processing technology has been proposed for reading a container identification code. However, prevention of loss of a container in the container yard, confirmation of a container position, and inventory data management on a real-time basis during container handling cannot be achieved only by reading the container identification code.

SUMMARY OF THE INVENTION

The object of the present invention is to provide a container handling apparatus and management system which overcome the above-described technical problems.

The self-propelled container handling apparatus according to the present invention comprises means for reading a container identification code borne on a container; and means for sensing a position of the container to be handled in a container yard; wherein this self-propelled container handling apparatus can sense the stocking position of the container to be carried at the container yard and read the identification code of the container at the stocking position in the container yard to handle the container in the container yard. This configuration makes it possible to sense the position of the container and to read the container identification code at the time of container handling. It is therefore possible to prevent erroneous reading of the container identification code, deterioration of the inventory data, and loss of the container. Also, when containers are carried in the container yard by a vessel, this configuration obviates the need of confirmation of the positions and identification codes of the plural containers to be placed at random positions, thus contributing to saving labor.

The container handling apparatus according to the present invention may be equipped with a lift capable of vertically shifting the container so that the container can be stacked. In this case, it is preferable that the container handling apparatus comprise a horizontal position sensing means for sensing the horizontal two-dimensional position of the container, on the basis of sensing of the position of the container handling apparatus itself by signals from artificial satellites; and a vertical position sensing means for sensing the vertical position of the container, on the basis of sensing of the vertical shifting distance of the container vertically shifted by the lift. This configuration makes it possible to sense the container position without limiting the free movement of the container handling apparatus and without influence of the container layout in the container yard.

The container handling apparatus according to the present invention may also comprise a lift capable of vertically shifting the container so that the container can be stacked; and a shifting apparatus for horizontally shifting the container without propelling the container handling apparatus itself. In this case, it is preferable that the container handling apparatus comprise a horizontal position sensing means for sensing the horizontal two-dimensional position of the container, on the basis of sensing of the position of the container handling apparatus itself by signals from artificial satellites; an additional horizontal position sensing means for sensing the horizontal two-dimensional position of the container, on the basis of sensing of the horizontal shifting distance of the container shifted by the shifting apparatus; and a vertical position sensing means for sensing the vertical position of the container, on the basis of sensing of the vertical shifting distance of the container vertically shifted by the lift. This configuration makes it possible to sense the position of the container without limiting the free movement of the container handling apparatus and without influence of the container layout in the container yard.

The horizontal position sensing means is preferably what is called a DGPS (Differential Global Positioning System). Specifically, it is preferable that the horizontal position sensing means have a reference station provided at a known reference position and a mobil station provided in the container handling apparatus, wherein the horizontal two-dimensional position of the container handling apparatus is determined by signals transmitted from plural artificial satellites to the mobil station, and the position is corrected on the basis of an error component obtained from signals transmitted from plural artificial satellites to the reference station. The error component can be determined from the pseudo-distance, time information, orbit data, and the like, determined via signals transmitted from plural artificial satellites to the reference station. Based on this principle of the DGPS makes it possible to improve container position sensing precision.

It is preferable that the container handling apparatus according to the present invention comprise means for assessing the position sensing precision of the horizontal position sensing means; and a second horizontal position sensing means for sensing the horizontal two-dimensional position of the container, on the basis of sensing of the position of the container handling apparatus itself; wherein the position of the container handling apparatus itself can be sensed by the second horizontal position sensing means, when the first horizontal position sensing means fails in the position sensing precision. The position sensing precision of the first horizontal position sensing means can be assessed on the basis of, for example, the number of artificial satellites from which signal can be received, the degree of dispersion of the plural artificial satellites, and the presence or absence of an error correction signal from the reference station of the DGPS, or the like. This configuration makes it possible to sense the horizontal position of the container mainly on the basis of sensing of the position of the container handling apparatus by signals from artificial satellites, and also makes it possible to sense the position of the container handling apparatus by the second horizontal position sensing means, when the sensing based on signals from artificial satellites fails in the position sensing precision. In this case, sensing of the horizontal position of the container by the first horizontal position sensing means is supplemented by the second horizontal position sensing means.

Alternatively, the container handling apparatus according to the present invention preferably comprises a second horizontal position sensing means for sensing the horizontal two-dimensional position of the container, on the basis of sensing of the position of the container handling apparatus itself; and means for assessing the position sensing precision of the second horizontal position sensing means; wherein the position of the container handling apparatus itself can be sensed by the first horizontal position sensing means, when the second horizontal position sensing means fails in the position sensing precision. This configuration makes it possible to sense the horizontal position of the container mainly on the basis of sensing of the position of the container handling apparatus by the second horizontal position sensing means, and makes it possible to sense the position of the container handling apparatus by signals from artificial satellites, when the second horizontal position sensing means fails in the position sensing precision. In this case, sensing of the horizontal position of the container by the second horizontal position sensing means is supplemented by the first horizontal position sensing means.

The second horizontal position sensing means may be a known one. For example, a distance-measuring signal, such as ultrasonic wave, radio wave or laser beam, may be transmitted from plural known positions to the container handling apparatus, or from the container handling apparatus to plural known positions, to sense the horizontal position of the container on the basis of the distance between each known position and the container handling apparatus. Also, the container handling apparatus may be installed with an image recognition means to sense the horizontal position of the container from the recognized image of its external environment. Also, the container yard may be provided with line marks, spot marks, ID tags, or the like, at known positions, and the container handling apparatus is provided with an apparatus for sensing such marks, ID tags, or the like, to sense the horizontal position of the container from the sensed marks, ID tags, or the like.

The second horizontal position sensing means preferably senses the position of the container handling apparatus itself, by an azimuth sensor and a self-propelling distance sensing apparatus provided in the container handling apparatus itself. The azimuth sensor can be configured with, for example, a gyrocompass. The self-propelling distance sensing apparatus can be configured with, for example, a distance-measuring wheel rotating as the container handling apparatus moves, and an encoder for detecting the rotation of the wheel. This configuration makes it possible to sense the position of the container by the second horizontal position sensing means without limitation of the free movement of the container handling apparatus and without influence of the container layout in the container yard. Furthermore, it is preferable that the container handling apparatus is provided with means for assessing the position sensing precision of the second horizontal position sensing means, wherein the precision is assessed on the basis of whether the position sensing time exceeds a preset time or not; and the second horizontal position sensing means can sense the position of the container handling apparatus itself, by using a reference position information readable at a known reference position as an initial value, when both the first horizontal position sensing means and the second horizontal position sensing means fail in position sensing precision. This configuration eliminates accumulated errors, which cause a failure in the position sensing precision of the second horizontal position sensing means, by sensing the position by using the information on the known reference position as the initial value, thus making it possible to recover the position sensing precision of the second horizontal position sensing means.

The means for reading the container identification code preferably has an image pickup apparatus capable of taking an image of the container identification code, and an image processor capable of recognizing the container identification code by an image signal transmitted from the image pickup apparatus. This configuration makes it possible to confirm the container identification code without visual inspection. The means for reading the container identification code preferably has a sensor capable of sensing the container, and a controller for outputting an image pickup instruction signal to the image pickup apparatus upon entry of a container sensing signal from the sensor. This configuration makes it possible to automatically confirm the identification code of the sensed container.

The container management system according to the present invention comprises the container handling apparatus according to the present invention; means for storing identification codes and stocking positions of containers stocked in the container yard as inventory data; and means for updating the inventory data on the basis of the container identification code read by the container handling apparatus and the container position sensed by the container handling apparatus, at the time of container handling by the container handling apparatus. This configuration makes it possible to accurately and automatically updating the container inventory data at the time of container handling by the container handling apparatus. In other words, the inventory data of the containers stocked in the container yard can be reliably managed on a real-time basis. In addition, the instructions for the container handling work can be efficiently given to the operator of the container handling apparatus, so that the number of workers responsible for the management of the verbal contact via the radio communication, inventory data transmission, and the like, can be reduced. Moreover, because the updating of the inventory data is based on the container identification code read by both the container handling apparatus and the container position sensed, the inventory data can be managed without one-way instructions as to container handling work from the manager to the container handling apparatus. Furthermore, operator-oriented container handling work is possible by presenting plural instructions as to container handling work on a display device provided in the container handling apparatus to select the appropriate item from the presented instructions by the operator of the container handling apparatus. This prevents the harsh instructions as to the container handling work from being given to the operator of the container handling apparatus.

The container management system according to the present invention preferably comprises means for entering the identification code and handling position of the container to be handled by the container handling apparatus; means for checking the entered container identification code and handling position against the container identification code read by the container handling apparatus and the container position sensed by the container handling apparatus, and means for outputting the checking result. This configuration makes it possible to check the identification code and handling position of the container actually handled by the container handling apparatus against the entered container identification code and handling position; and to prevent erroneous container handling by generating an alarm or the like to give a caution in the case of a disagreement.

The container management system according to the present invention preferably comprises means for storing an identification code of a container scheduled to be carried in the container yard, and an identification code of a container scheduled to be carried out from the container yard; means for reading the identification code of the container to be carried in the container yard before it is read by the container handling apparatus; means for reading the identification code of the container to be carried out from the container yard after it is read by the container handling apparatus; means for checking the identification code of the container scheduled to be carried in the container yard against the container identification code read at the time when the container is carried in the container yard, and for checking the identification code of the container scheduled to be carried out from the container yard against the container identification code read at the time when the container is carried out from the container yard; and means for outputting the checking result. In this case, the identification code of the container carried in, or carried out from, the container yard can be read at, for example, a container yard gate when the containers are carried in, or carried out from, the container yard with a truck or the like. This configuration surely prevents the containers not to be carried in, and not to be carried out from, the container yard, from being carried in, and carried out from, the container yard.

DESCRIPTION OF THE PREFERRED EMBODIMENTS

Figure 1:
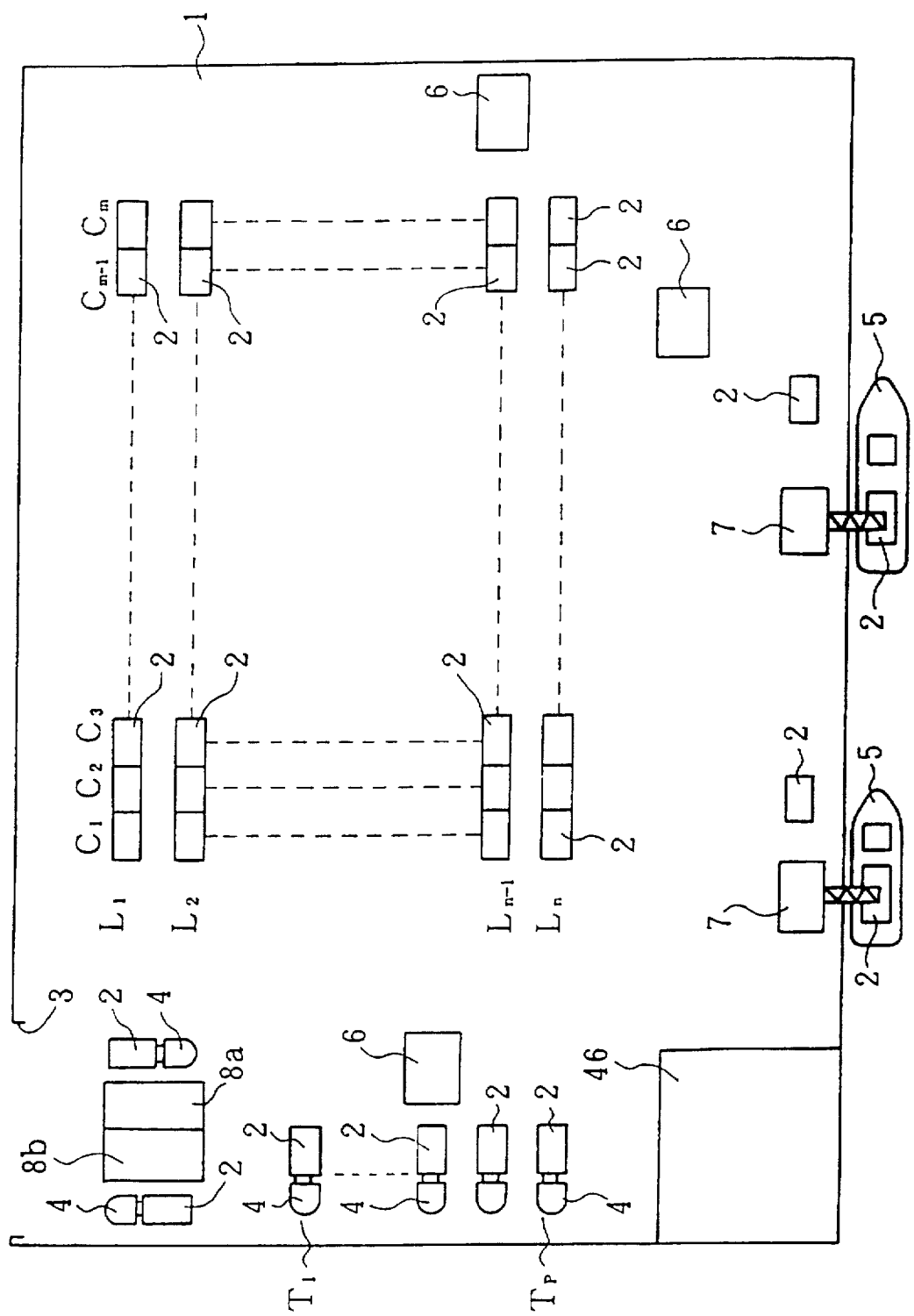
FIG. 1 illustrates the layout of the container yard of an example of the present invention.
Figure 2:
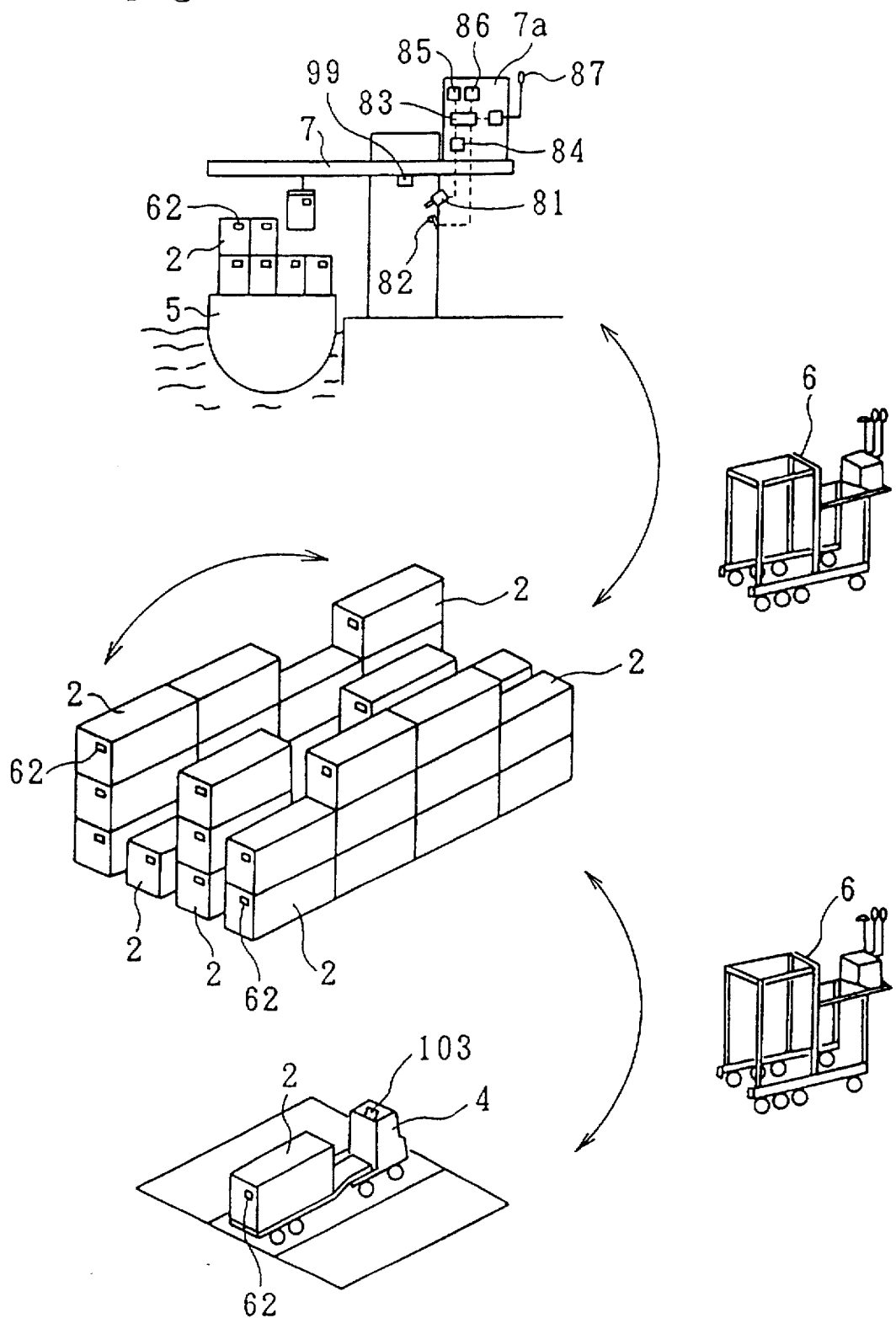
FIG. 2 illustrates the configuration of the container yard of the example.

The container yard 1 illustrated in FIG. 1 has plural rows of stocking lanes $L_1, L_2 \ldots L_{n-1}, L_n$. Each lane has plural container placement sites $C_1, C_2 \ldots c_{m-1}, C_m$ in a row. As illustrated in FIG. 2, containers 2 are stacked in plural layers at each container placement site. The containers 2 placed in the container yard 1 are carried by trucks 4 which pass a gate 3 and by vessels 5 which anchor at a wharf. The containers 2 stocked in the container yard 1 are handled by plural self-propelled container handling apparatuses 6. The truck 4 entering in the container yard 1 via the gate 3 moves to any of truck lanes $T_1, T_2 \ldots T_p$. On any of the truck lanes $T_1, T_2 \ldots T_p$, the container 2 is loaded to, or unloaded from, the truck 4 by the container handling apparatus 6. As container handling apparatuses for the vessels 5, plural gantry cranes 7 are provided for loading the containers 2 to, and unloading them from, the vessels 5. For each gantry crane 7, a place to handle the containers 2 for the vessels 5 is specified; the containers 2 are loaded to, or unloaded from, the specified handling place by the container handling apparatuses 6. The container yard 1 is provided with a main management room 46, an entrance gate management room 8a for managing the trucks 4 entering the container yard via the gate 3, and an exit gate management room 8b for managing the trucks 4 exiting via the gate 3.

Figure 3:
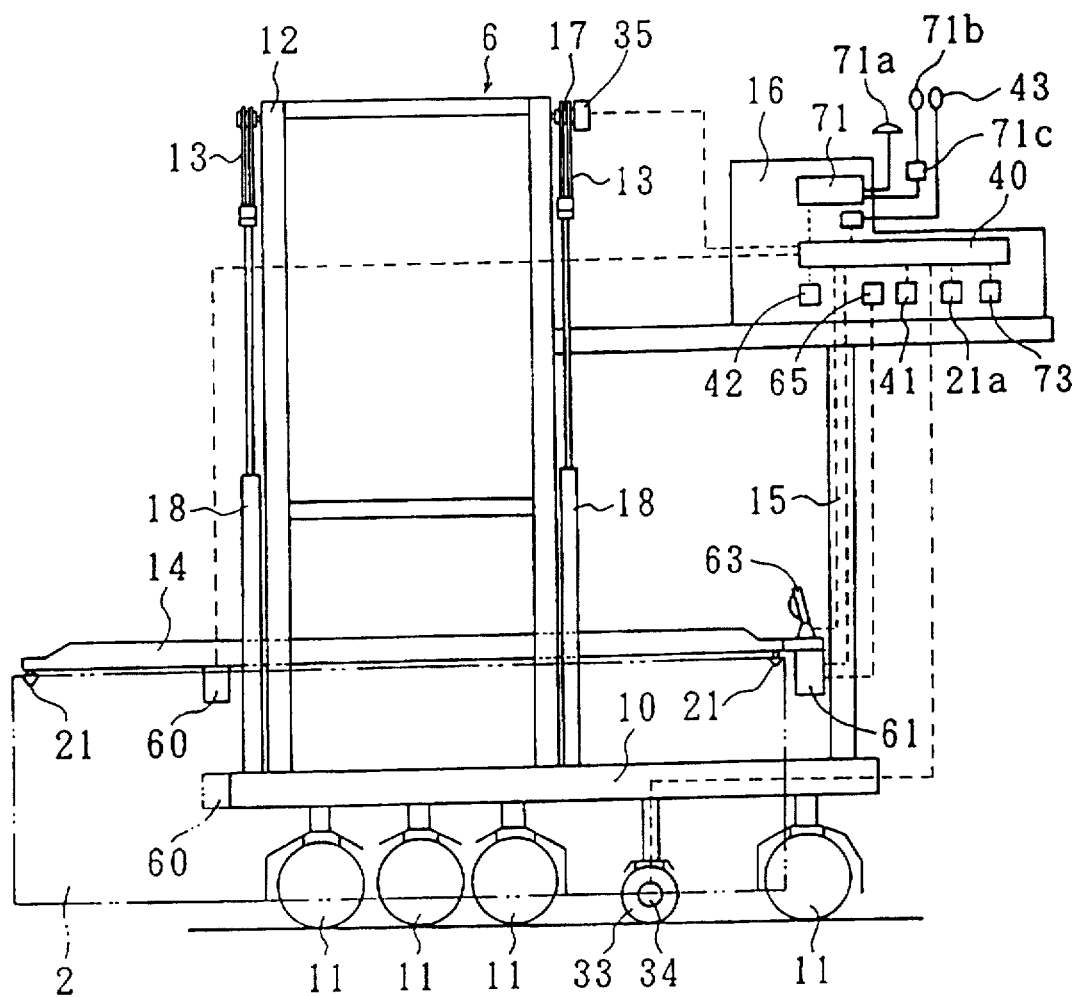
FIG. 3 is a side view of the container handling apparatus of the example.
Figure 4:
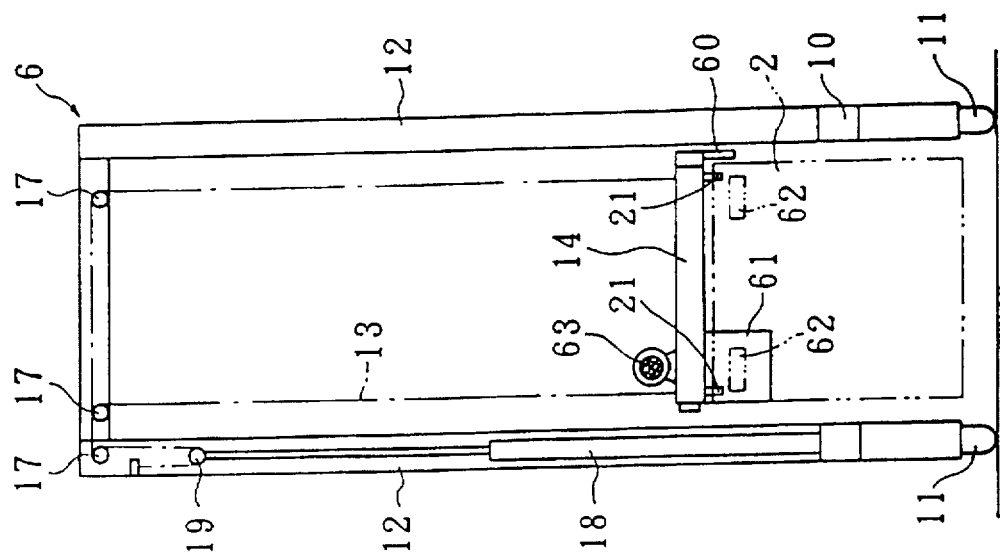
FIG. 4 is a front view of the container handling apparatus of the example.

Each self-propelled container handling apparatus 6 is equipped with a lift for vertically shifting a container 2 held by itself. As illustrated in FIGS. 3 and 4, the container handling apparatus 6 of the present example is of the straddle carrier type, comprising a body 10 having plural masts 12, wheels 11 supporting the body 10, a spreader 14 suspended from the body 10 so as to be able to move vertically by hydraulic cylinders 18 and chains 13, and an operator's cab 16 attached onto the body 10 by supporting columns 15. Each chain 13 is wound around a sprocket 17 attached to the body 10 and another sprocket 19 fitted to the tip of the hydraulic cylinder 18, and one end of each chain 13 is attached to the spreader 14 and the other end of each chain 13 is attached to the body 10. By this configuration, the spreader 14 moves vertically as the hydraulic cylinders 18 stretch and contract. The spreader 14 is stretchable according to the size of the container 2, and consists mainly of a frame whose plan view is rectangular. At each corner of the frame, a container holding claw 21 is provided. Each container holding claw 21 is hooked to the inner face of the container 2, when it is rotated by 90 degrees around the vertical axis after insertion into a hole formed in the upper portion of the container 2. Therefore, by placing the container 2 between the left and right masts 12, hooking the container holding claws 21 of the spreader 14 to the container 2, and raising the spreader 14, the container handling apparatus 6 can move in a state of holding the container 2. An operating apparatus 21a for the holding claws 21 is connected to a controller 40 provided in the operator's cab 16 of the container handling apparatus 6. The controller 40 can be configured with a digital computer having a storage device. A data entry apparatus 41 configured with keyboard switches, a display apparatus configured with a CRT display etc., and a radio communication apparatus 43 for data transmission are connected to the controller 40.

A container sensor 60, an image pickup apparatus 61, and a lighting apparatus 63 are attached to the spreader 14. The sensor 60 can be configured with, for example, a proximity sensor; when the front end of the body 10 of the container handling apparatus 6 approaches to a container 2, the sensor 60 outputs a container sensing signal. The image pickup apparatus 61 can be configured with, for example, a CCD camera, and is capable of taking an image of a identification code 62 borne on the container 2. The lighting apparatus 63 lights the portion of the container 2 to be imaged.

Figure 5:
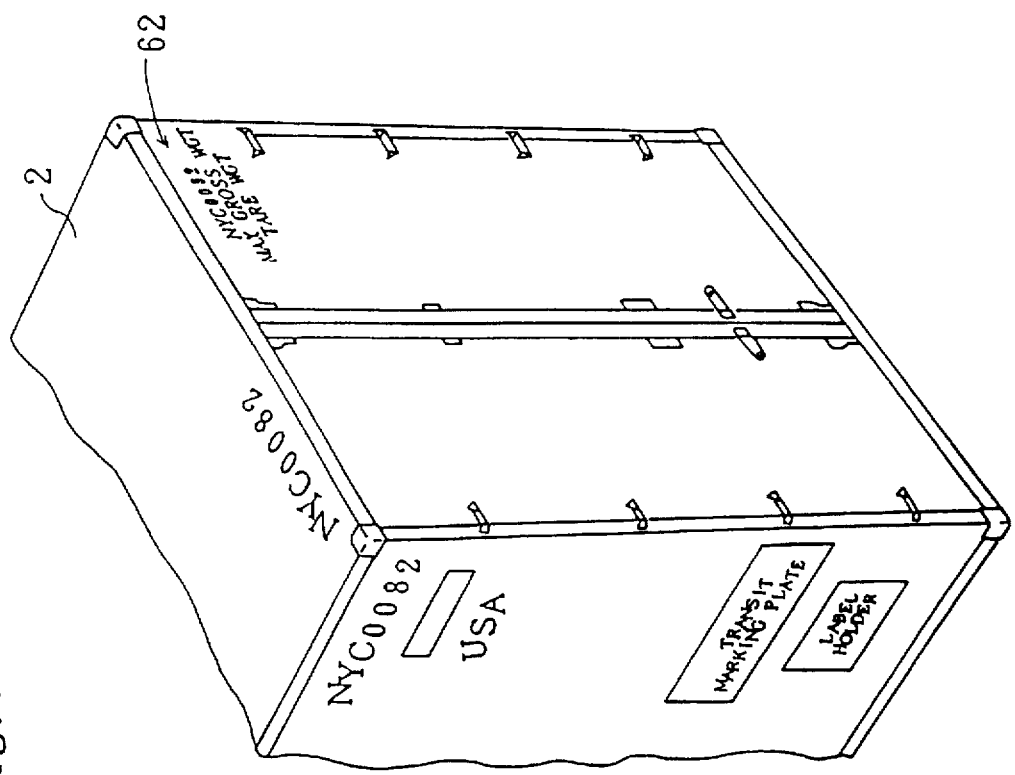
FIG. 5 is a perspective view of a part of a container.

As illustrated in FIG. 5, the identification code 62, whose image is taken, consists of alphanumerical characters including an owner code and a serial number, which are required to appear on both ends and other portions of the container 2 by the ISO Standards (ISO/TC104). An image of a nation code, a dimension code, a type code or the like may be taken and used as attribute information to improve container checking reliability.

As illustrated in FIG. 3, the container sensor 60, image pickup apparatus 61 and lighting apparatus 63 are connected to the controller 40 of the container handling apparatus 6. The image pickup apparatus 61 is connected to the controller 40 via an image processor 65. The controller 40 outputs an image pickup instruction signal to the image pickup apparatus 61 upon entry of a container sensing signal from the container sensor 60. Upon reception of the image pickup instruction signal, the image pickup apparatus 61 takes an image of the identification code 62 of the container 2 to be held by the container handling apparatus 6. The controller 40 outputs a lighting instruction signal to the lighting apparatus 63 to light the portion of the container 2 to be imaged at the time of imaging. The image processor 65 recognizes the container identification code 62 by the image signal transmitted from the image pickup apparatus 61, and outputting a recognition signal of the container identification code 62 to the controller 40.

Figure 6:
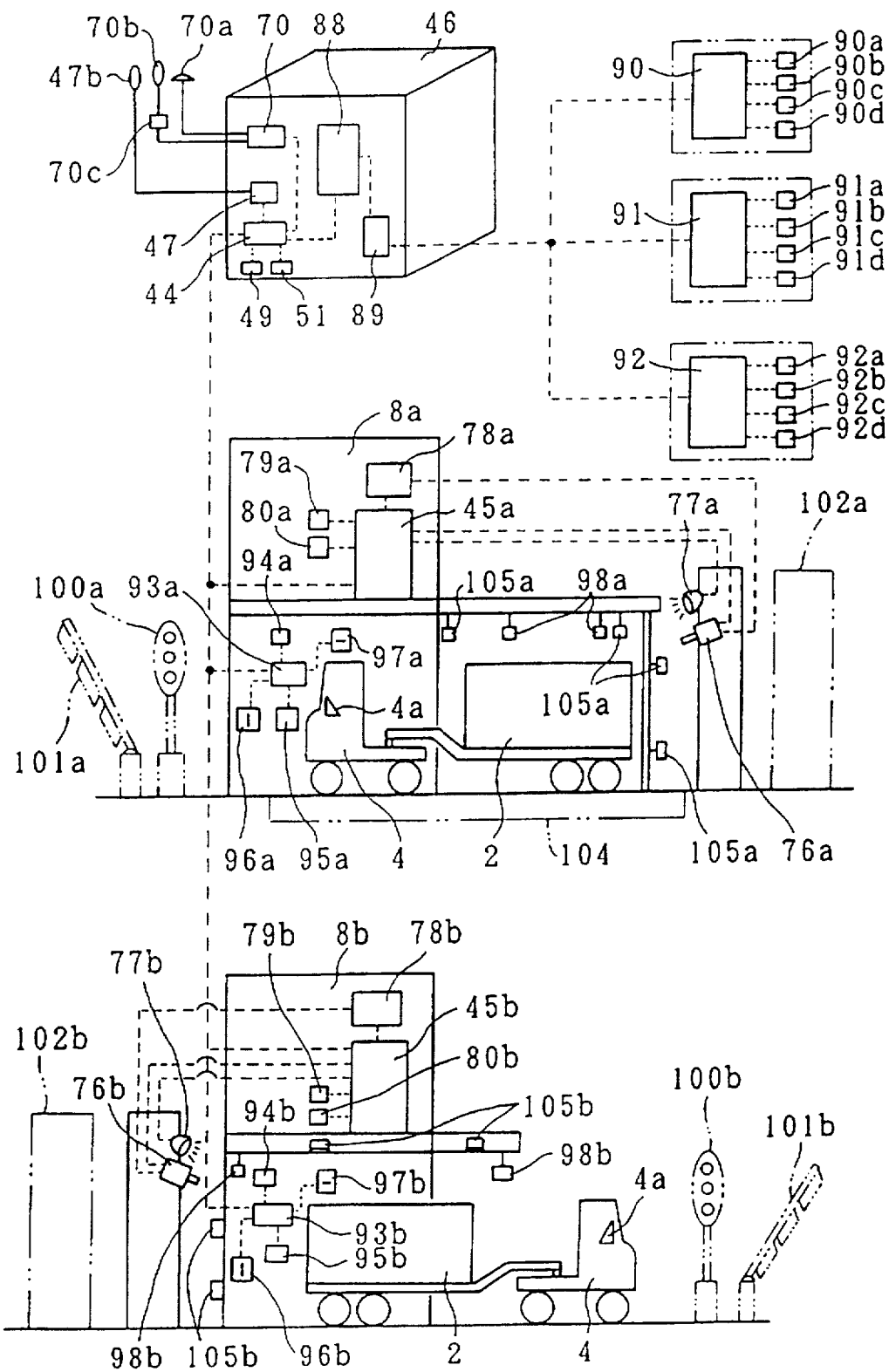
FIG. 6 illustrates the configuration of the management rooms of the example.

A DGPS is provided as a horizontal position sensing means to sense the horizontal two-dimensional position of a container 2 handled by the container handling apparatus 6, on the basis of sensing of the position of the container handling apparatus 6 by signals from artificial satellites. Specifically, the above-described main management room 46 is treated as a known reference position, and is provided with a reference station 70 as illustrated in FIG. 6. As illustrated in FIG. 3, the operator's cab 16 of each container handling apparatus 6 is provided with a mobil station 71. The reference station 70 receives signals from plural artificial satellites via an antenna 70a, and transmits a DGPS correction signal based on those signals from a transmitter 70c via an antenna 70b. The mobil station 71 receives signals from plural artificial satellites via an antenna 71a, and receives the correction signal transmitted from the reference station 70 via an antenna 71b and a receiver 71c, and determines the horizontal two-dimensional position of itself by the signals from the artificial satellites, and corrects the determined position on the basis of the correction signal. The signal of the corrected position is transmitted to the controller 40 of the container handling apparatus 6.

A vertical position sensing means for sensing the vertical position of a container 2 handled is provided, it senses the position on the basis of sensing of the vertical shifting distance of the container 2 vertically shifted by the above-described lift of the container handling apparatus 6. Specifically, as illustrated in FIG. 3, an encoder 35 is attached to the sprocket 17 around which the chain 13 supporting the spreader 14 of the container handling apparatus 6 is wound; the signal from the encoder 35 is transmitted to the controller 40 of the container handling apparatus 6. On the basis of the transmitted signal, the controller 40 calculates the vertical shifting distance of the container 2.

As illustrated in FIG. 6, the main management room 46 is provided with a controller 44 connected to the above-described reference station 70. The controller 44 can be configured with a digital computer having a storage device. A data entry apparatus 49 configured with a keyboard switch, a display apparatus 51 configured with a CRT display etc., a radio communication apparatus for data transmission, and a transmission/reception antenna 47b are connected to the controller 44.

The controller 40 of the container handling apparatus 6 assesses the position sensing precision of the DGPS, which senses the two-dimensional position of the container handling apparatus 6, on the basis of the signal transmitted from the reference station 70. The signals transmitted from the mobil station 71 to the controller 40 include the number of artificial satellites from which signals can be received, the degree of dispersion of the plural artificial satellites, the angles of attack of the artificial satellites, and the position after the error correction by the DGPS. For example, if the number of artificial satellites from which the signals can be received decreases, or the plural artificial satellites from which the signals can be received are not dispersed but concentrated, or the reference station 70 fails to transmit the error correction signal by the DGPS, the position sensing precision in sensing of the two-dimensional position of the container handling apparatus 6 decreases.

Figure 7:
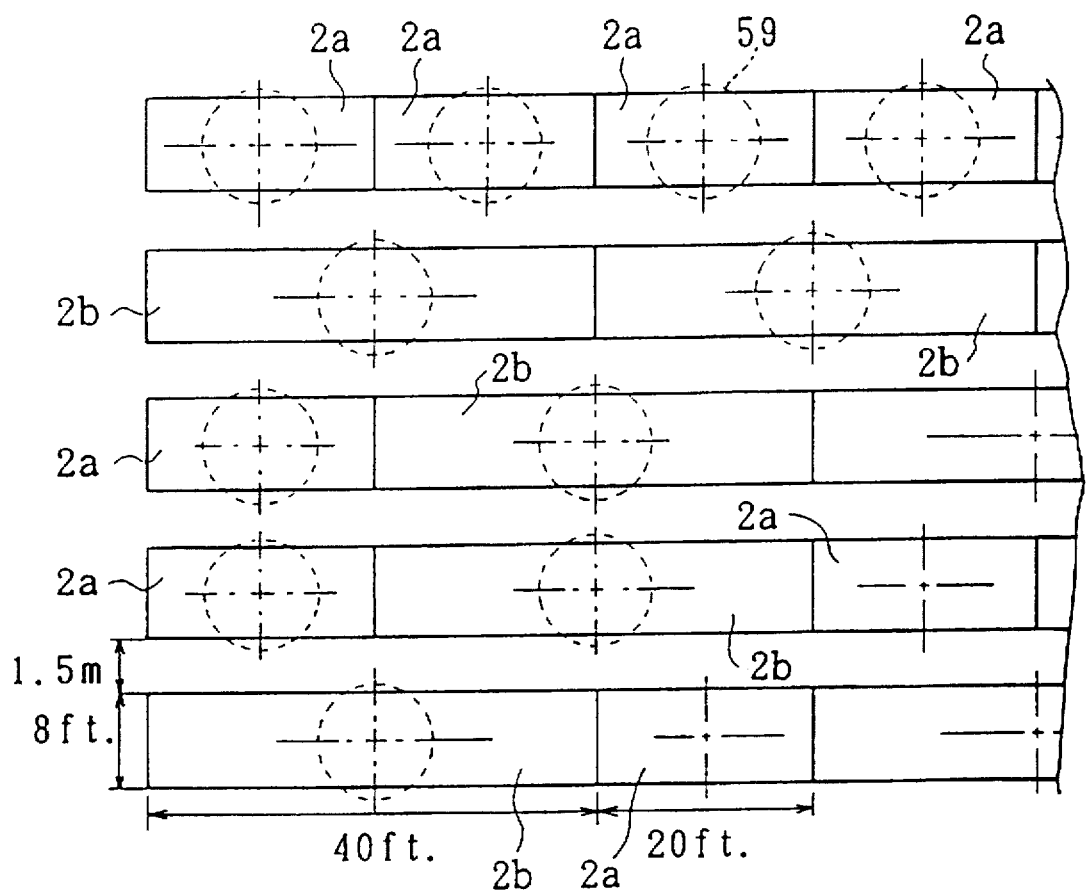
FIG. 7 illustrates the arrangement of the containers of the example.
Figure 8:
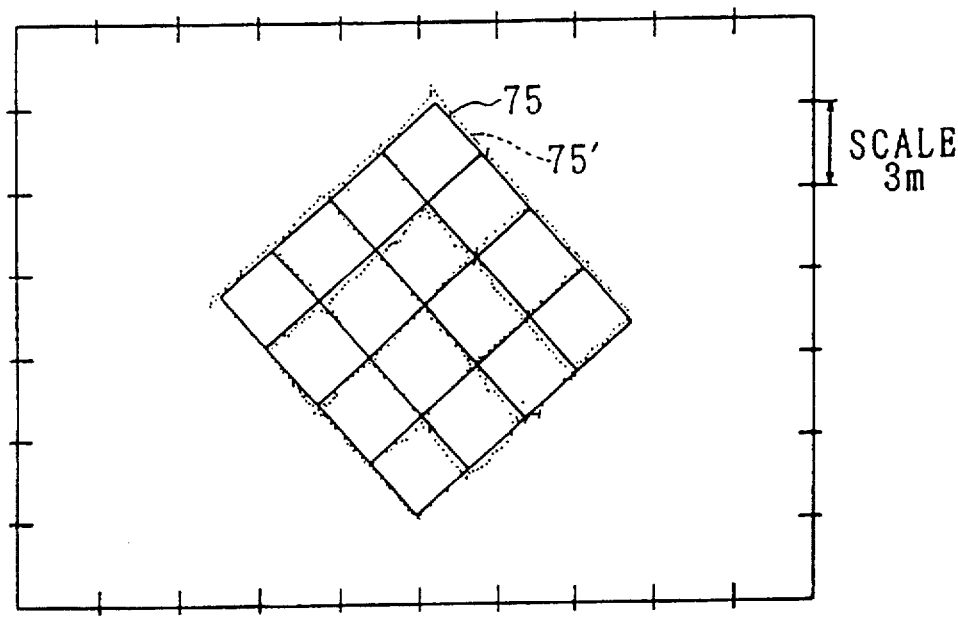
FIG. 8 illustrates a method of measuring the precision in the position sensing by the DGPS.

The precision of the DGPS in sensing of the horizontal two-dimensional position of the container handling apparatus 6 is set on the basis of dimensions and layout of the containers 2 in the container yard 1, so that the positions of the containers 2 can be distinguished to each other. For example, as illustrated in FIG. 7, when containers 2a of 20 feet in length and containers 2b of 40 feet in length are present on each lane, each of the containers 2a and 2b has a width of 8 feet, and the lane interval is about 1.5 meters, the circles 59 of 10 feet in diameter shown by dotted lines do not cross with each other even if their center is positioned at the center of each container 2. In this case, the precision in sensing of the horizontal two-dimensional position of the container handling apparatus 6 is allowed to have an error of up to ±5 feet. As shown in FIG. 8, the precision of the DGPS in sensing of the horizontal two-dimensional position of the container handling apparatus 6 is experimentally obtained by, for example, driving the container handling apparatus 6 along a lattice course 75, plotting the positions sensed by the DGPS, and calculating the difference between the track 75' of the plots and the course 75. The precision assessment is performed by the controller 40 of the container handling apparatus 6.

In addition to the above-described DGPS, a second horizontal position sensing means for sensing the horizontal two-dimensional position of the container 2 is provided, it senses the position of the container 2 on the basis of the sensing of the position of the container handling apparatus 6. Specifically, as illustrated in FIG. 3, the second horizontal position sensing means has an azimuth sensor 73 and a self-propelling distance sensing apparatus. The azimuth sensor 73 can be configured mainly with, for example, a gyrocompass, and transmits the detected azimuth signal to the controller 40 of the container handling apparatus 6. The self-propelling distance sensing apparatus has, for example, a distance-measuring wheel 33 attached to the body 10, and an encoder 34 attached to the distance-measuring wheel 33 for sensing the number of rotations of the wheel 33, and the encoder 34 is connected to the controller 40 of the container handling apparatus 6.

The controller 40 can sense the horizontal two-dimensional position of the container handling apparatus 6 by the second horizontal position sensing means, i.e., by the signal from the azimuth sensor 73 and from the encoder 34, when the first horizontal position sensing means, i.e., the DGPS fails in the precision in sensing of the horizontal two-dimensional position of the container handling apparatus 6. In this case, the controller 40 senses the position of the container handling apparatus 6 mainly by the DGPS, and supplements the position sensing by the second horizontal position sensing means when the DGPS fails in the position sensing precision.

Conversely, the controller 40 can sense the horizontal two-dimensional position of the container handling apparatus 6 by the DGPS, when the second horizontal position sensing means fails in the precision in sensing of the horizontal two-dimensional position of the container handling apparatus 6. The position sensing precision of the second horizontal position sensing means decreases by the accumulation of error. Therefore, the controller 40 assesses the position sensing precision of the second horizontal position sensing means on the basis of whether the position sensing time exceeds a preset time or not. The preset time can be experimentally obtained. In this case, the controller 40 senses the position of the container handling apparatus 6 mainly by the second horizontal position sensing means, and supplements the position sensing by the DGPS when the second horizontal position sensing means fails in the position sensing precision. This supplementation is achieved by the position sensing of the second horizontal position sensing means, using the position sensed by the DGPS as the initial value.

Furthermore, means for recovering the position sensing precision of the second horizontal position sensing means is provided, it recovers the precision when both the DGPS and the second horizontal position sensing means fail in the position sensing precision. For such recovery, the accumulation of the error, which causes a failure in the position sensing precision of the second horizontal position sensing means, is eliminated by using a known reference position information as the initial value for the position sensing. Specifically, the container handling apparatus 6 is moved to a reference position set at a known position in the container yard 1, when the position sensing by the second horizontal position sensing means exceeds the preset time. At the reference position, the reference position information is entered in the controller 40. By using the reference position information as the initial value, the position sensing is performed by the second horizontal position sensing means. For example, the lane number corresponding to the container lane, the number of line on each lane, and the number of stair in the stacked layers are entered via the data entry apparatus 41. Alternatively the reference position information may be entered by providing a mark bearing the information of the reference position and providing a reader to read the information with the container handling apparatus 6. This configuration prevents reduction of the sensing precision, even when the position sensing by the second horizontal position sensing means takes long time.

As illustrated in FIG. 6, the above-described gate management rooms 8a and 8b are provided with image pickup apparatuses 76a and 76b and lighting apparatuses 77a and 77b. The image pickup apparatuses 76a and 76b and lighting apparatuses 77a and 77b are connected to controllers 45a and 45b of the gate management rooms 8a and 8b. In addition, the image pickup apparatuses 76a and 76b are connected to the controllers 45a and 45b via image processors 78a and 78b. Each of the controllers 45a and 45b can be configured with a digital computer having a storage device, and is connected to the controller 44 of the main management room 46 so that data transmission and reception are possible. Data entry apparatuses 79a and 79b configured with keyboard switches, and display apparatuses 80a and 80b configured with CRT displays etc., are connected to the controllers 45a and 45b. The controllers 45a and 45b output image pickup instruction signals to the image pickup apparatuses 76a and 76b upon reception of the container sensing signals from container sensors 98a and 98b. Upon reception of the image pickup instruction signals, the image pickup apparatuses 76a and 76b take images of the identification codes 62 borne on the containers 2 held by the trucks 4. At the time of the imaging, the controllers 45a and 45b output lighting instruction signals to the lighting apparatuses 77a and 77b to light the portions of the containers 2 to be imaged. The image processors 78a and 78b recognize the container identification codes 62 by the image signals transmitted from the image pickup apparatuses 76a and 76b, and output recognition signals of the container identification codes 62 to the controllers 45a and 45b. This configuration makes it possible to read the identification code 62 of a container 2 to be carried in the container yard 1 at the entrance gate management room 8a, before it is read by the container handling apparatus 6. Also, the identification code 62 of a container 2 to be carried out from the container yard 1 is read at the exit gate management room 8b, after it is read by the container handling apparatus 6.

As illustrated in FIG. 2, each gantry crane 7 is provided with an image pickup apparatus 81 and a lighting apparatus 82. The image pickup apparatus 81 and the lighting apparatus 82 are connected to a controller 83 provided in the management room 7a of the gantry crane 7. The image pickup apparatus 81 is connected to the controller 83 via an image processor 84. The controller 83 can be configured with a digital computer having a storage device, and is connected with a data entry apparatus 85 configured with a keyboard switch, a display apparatus 86 configured with a CRT display etc., and a radio communication apparatus 87 for data transmission. The controller 83 outputs an image pickup instruction signal to the image pickup apparatus 81 upon reception of a container sensing signal from a container sensor 99. Upon reception of the image pickup instruction signal, the image pickup apparatus 81 takes an image of the identification code 62 borne on the container 2 handled by the gantry crane 7. At the time of the imaging, the controller 83 outputs a lighting instruction signal to the lighting apparatus 82 to light the portion of the container 2 to be imaged. The image processor 84 recognizes the container identification code 62 by the image signal transmitted from the image pickup apparatus 81, and outputs a recognition signal of the container identification code 62 to the controller 83. Therefore, the identification code 62 of a container 2 to be carried in the container yard 1 is read before it is read by the container handling apparatus 6, and the identification code 62 of a container 2 to be carried out from the container yard 1 is read after it is read by the container handling apparatus 6, at the management room 7a for the gantry crane 7.

As illustrated in FIG. 6, a host computer 88 is connected to the controller 44 of the above-described main management room 46. The host computer 88 stores the identification codes 62 and stocking positions of the containers 2 stocked in the container yard 1 as inventory data. Each stocking position of the container 2 can be composed of, for example, the lane number corresponding to the container lane, the number of line on each lane, and the number of stair in the stacked layers.

The inventory data stored in the host computer 88 can be transferred from the controller 44 of the main management room 46 to the controller 40 of each container handling apparatus 6 via radio communication apparatuses 47 and 43. Upon handling of a container 2 stocked in the container yard 1, the controller 40 of each container handling apparatus 6 can update the inventory data, on the basis of the container identification code 62 read at the time of the container handling and the container position sensed at the time of the container handling. The result of the updating of the inventory data can be transferred from the controller 40 of each container handling apparatus 6 to the controller 44 of the main management room 46 via radio communication apparatuses 43 and 47. The controller 44 of the main management room 46 can update the inventory data stored in the host computer 88.

The controller 40 of the container handling apparatus 6 can check the identification code 62 and handling position of a container 2, which are stored at the time of the work selection described later, against the identification code 62 of the container 2 read at the time of the container handling and the container position sensed at the time of the container handling, and can output the checking result.

The host computer 88 is connected to an information processing controller 90 owned by the consignor, an information processing controller 91 owned by the land transporter who transports containers 2 by trucks 4, and an information processing controller 92 owned by the marine transporter who transports containers 2 by vessels 5, via a on-line terminal computers 89 for data transmission. Specifically, the container yard 1, the consignor, the land transporter, and the marine transporter are mutually connected via what is called WAN (wide area network). Each of the information processing controllers 90, 91 and 92 can be configured with a digital computer having a storage device, and is connected with a data entry apparatus 90a, 91a or 92a configured with a keyboard switch, a display apparatus 90b, 91b or 92b configured with a CRT display etc., a printer 90c, 91c or 92c, and an IC card reader-writer 90d, 91d or 92d, etc.

The consignor requests the land transporter and the marine transporter via the WAN to transport own cargo. The land transporter or marine transporter prepares a container 2 suitable to the amount and kind of the cargo. The land transporter transports the cargo-loaded container 2 by a truck 4 between the consignor and the container yard 1. The marine transporter transports the cargo-loaded container 2 by a vessel 5 between the container yard 1 and another container yard. The land transporter or marine transporter issues an IC card bearing the names of the transporter and truck driver who transports the container 2. The IC card, a password for reading the IC card, and work instruction information are given to the driver of the truck 4. The work instruction information includes, for example, consignor information and cargo destination and the like. The work instruction information may be given by a paper sheet, or when the truck 4 is equipped with an IC card reader 4a, the work instruction information may be written in the IC card. Also, the IC card may bear work instruction information for plural containers 2. The consignor's information processing controller 90 can confirm the transporters and the driver of the truck 4 by the IC card. Also, the consignor's information processing controller 90 can write attribute information of the container 2, such as the identification code 62 of the container 2, the dimensions of the container 2, container specifications, e.g., whether or not for refrigeration, cargo contents, and a number on the sealing tape for sealing the door to the container 2, and the like, in the IC card.

Via the WAN, the identification codes 62 of the containers 2 scheduled to be carried in, and scheduled to be carried out from, the container yard, and the names of the transporters and truck drivers who transport the container 2 are transferred to, and stored in, the host computer 88 of the container yard 1. The container attribute information, such as the dimensions of the container 2, sealing tape number, or the like may also be transferred to, and stored in, the host computer 88. For the containers 2 scheduled to be carried in, and scheduled to be carried out from, the container yard 1, a plan for container handling work in the container yard 1 is prepared; and the plan is stored in the host computer 88. From the attribute information on the containers 2 scheduled to be carried in, and scheduled to be carried out from, the container yard 1, previously transferred via WAN, checking of the containers 2 at the time when they are carried in, and carried out from, the container yard 1, can be performed by only the identification codes 62 of the containers 2. In addition, by adding the container attribute information to the identification code 62, the reliability of checking of the container 2 can be improved.

As illustrated in FIG. 6, each of the gate management rooms 8a and 8b is provided with a gate management controller 93a or 93b. Each of the gate managing controllers 93a and 93b can be configured with a digital computer having a storage device, and is connected with a data entry apparatus 94a or 94b configured with a keyboard switch, a display apparatus 95a or 95b configured with a CRT display etc., a printer 96a or 96b, and an IC card reader-writer 97a or 97b. By the reader-writer 97a or 97b, the names of the transporter and truck driver, and if any, other container attribute information, written in the IC card of the driver of the truck 4, are read in each of the gate management controllers 93a and 93b. To each of the gate management controllers 93a and 93b, the identification codes 62 of containers 2 scheduled to be carried in, and scheduled to be carried out from, the container yard 1, the names of the transporters, the names of the truck drivers, and if any, other container attribute information, are transmitted from the host computer 88. In addition, the identification codes 62 of the containers 2 read by the image pickup apparatus 76a and 76b are transmitted to the gate management controllers 93a and 93b. Each of the gate management controllers 93a and 93b checks the identification code 62 of the container 2 scheduled to be carried in, or scheduled to be carried out from, the container yard, the transporter's name, the truck driver's name, and if any, other container attribute information, against the identification code 62 of the container 2 actually carried in, or carried out from, the container yard, the names of the transporter and truck driver who actually transport the container 2, and if any, other container attribute information. If an incorrect checking result is obtained, caution is given by, for example, presenting an alarm message on the display apparatus 95a or 95b. If a correct checking result is obtained, a paper sheet is issued to the driver of the truck 4 by the printer 96a, when the container 2 is carried in. The paper sheet is printed with the number of any of the truck lanes $T_1$, $T_2$ ... $T_p$, to which the truck 4 is to go. Each of the gate management rooms 8a and 8b may be provided with a signal mechanism 100a or 100b, and/or a barrier 101a or 101b, which are controlled by the controller 93a or 93b according to the checking result. Each of the gate management rooms 8a and 8b may also be provided with an image recorder 102a or 102b for recording the damage condition of the container 2 to clarify who is responsible for, if any, damage of the container 2. When the container 2 is carried in, a number card 103 for identification of the truck 4, or the like, may be placed on the roof of the operator's cab of the truck 4, or elsewhere, as illustrated in FIG. 2, in addition to indication of the number of any of the truck lanes $T_1$, $T_2$ ... $T_p$. The entrance gate management room 8a may be provided with a weight scale 104 for weighing the container 2 and/or a dimension-measuring apparatus 105a, utilizing for checking of the container 2 and for preparing of a container handling work plan to load containers 2 to vessels 5.

To the controller 83 of the gantry crane 7, the identification codes 62 of the containers 2 scheduled to be carried in, and scheduled to be carried out from, the container yard 1 are transferred from the host computer 88. The controller 83 checks the identification code 62 of the container 2 scheduled to be carried in, and the identification code 62 of the container 2 scheduled to be carried out from, the container yard 1 by a vessel 5 against the identification code 62 of the container 2 read by the image pickup apparatus 81 at the time of container handling by the gantry crane 7. If an incorrect checking result is obtained, caution is given by, for example, presenting an alarm message on the display apparatus 86.

Figure 9:
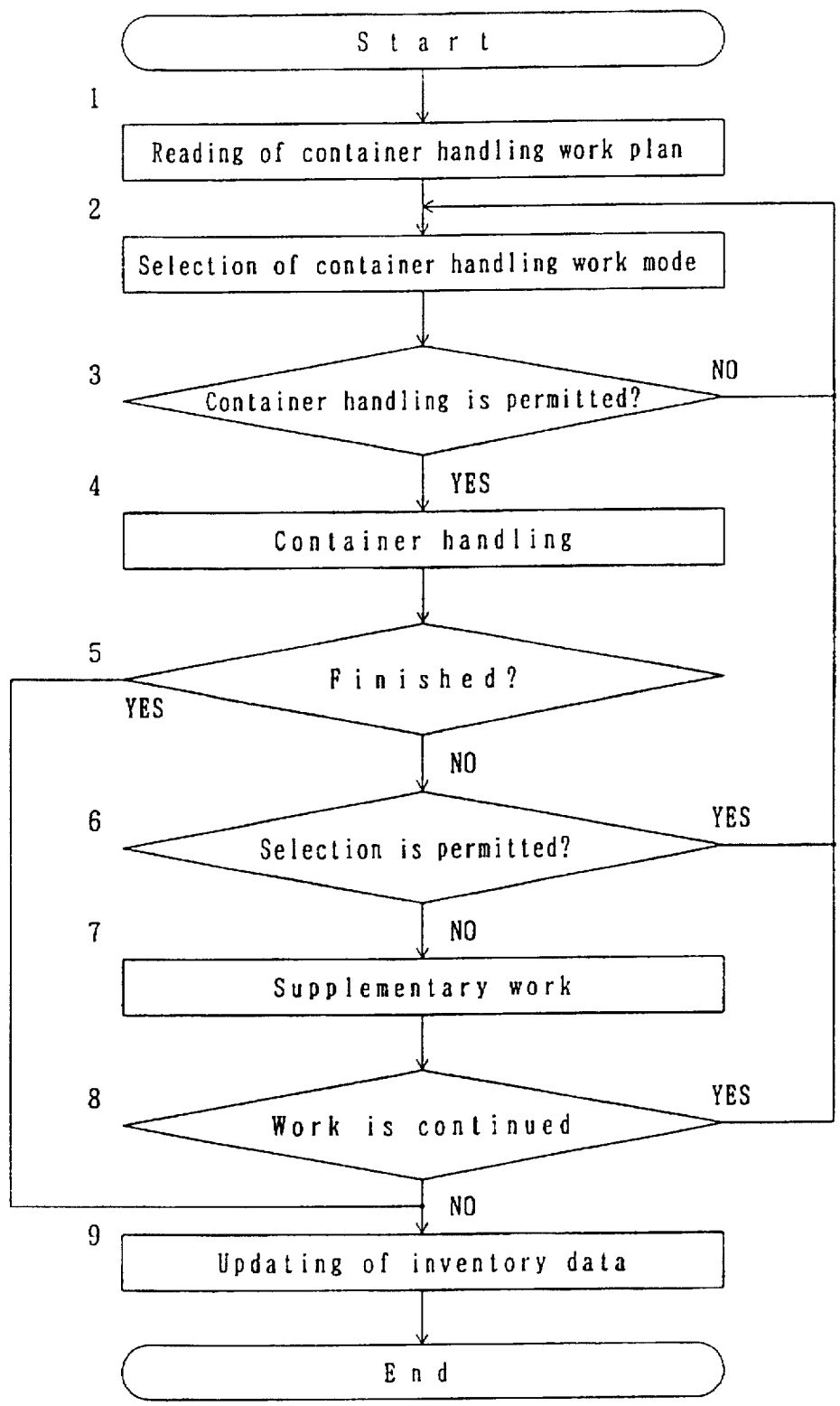
FIG. 9 is a flow chart of the procedures for container handling information processing at the container yard of the example.

The flow chart of FIG. 9 shows the procedures of container handling information processing in a container handling apparatus 6. First, the container handling work plan is read in the controller 40 of the container handling apparatus 6 from the controller 44 of the main management room 46 (step 1). This reading may be achieved by a radio communication apparatus 43 and 47, or achieved in a batchwise manner by using a medium such as an IC card. It should be noted that the controller 44 of the main management room 46 previously reads the master file of the inventory data from the host computer 88. According to the container handling work plan, various container handling work modes are presented on the display apparatus 42 of the controller 40 of the container handling apparatus 6. The operator of the container handling apparatus 6 selects one of the handling work modes presented (step 2). Such container handling work modes include the mode in which a container 2 is carried in a stocking position from a truck 4, the mode in which a container 2 is shifted from a stocking position to a truck 4, the mode in which a container 2 is carried in a preset stocking position from a container handling position of the gantry crane 7, the mode in which a container 2 is carried in a random stocking position from a container handling position of the gantry crane 7, the mode in which a container 2 is shifted from a stocking position to a container handling position of the gantry crane 7, the martialing mode, and the free movement mode. The operator of the container handling apparatus 6 selects one work from the container handling work list presented under the mode selected.

Next, the controller 44 of the main management room 46 determines whether the selected container handling work is permitted or not (step 3). For example, in cases where there is a risk of collision with another container handling apparatus 6 or in case where another container handling apparatus 6 selected the same work immediately before the current container handling apparatus 6 selects it, the work is not permitted. If the work is not permitted, selection in step 2 is performed again. If permitted, the container handling work is performed, and work completion information and new inventory data are transferred to the controller 44 of the main management room 46 via radio communication apparatuses 43 and 47. The controller 40 then receives information about confirmation of updating of the master file of the inventory data and about permission of next work selection from the controller 44 of the main management room 46 via the radio communication apparatuses 43 and 47 (step 4). Next, judgment is made as to whether the container handling work is to be finished or not (step 5). If the work is not to be finished, the operator of the container handling apparatus 6 checks whether selection of a new container handling work is permitted or not (step 6). If selection of a new container handling work is permitted, step 2 is performed again. For example, in case where the previously performed container handling work is erroneous, permission is not given to select a new container handling work from the controller 44 of the main management room 46 in step 6. If selection of a new container handling work is not permitted, supplementary work, such as re-performance of the previous container handling work or elimination of the error or the like, is performed (step 7). Next, judgment is made as to whether the container handling work is to be continued or not (step 8). If the container handling work is continued, step 2 is performed again. If the container handling work is discontinued, or if the container handling work is to be finished in step 5, the master file of the inventory data of the host computer 88 is updated (step 9).

Figure 10:
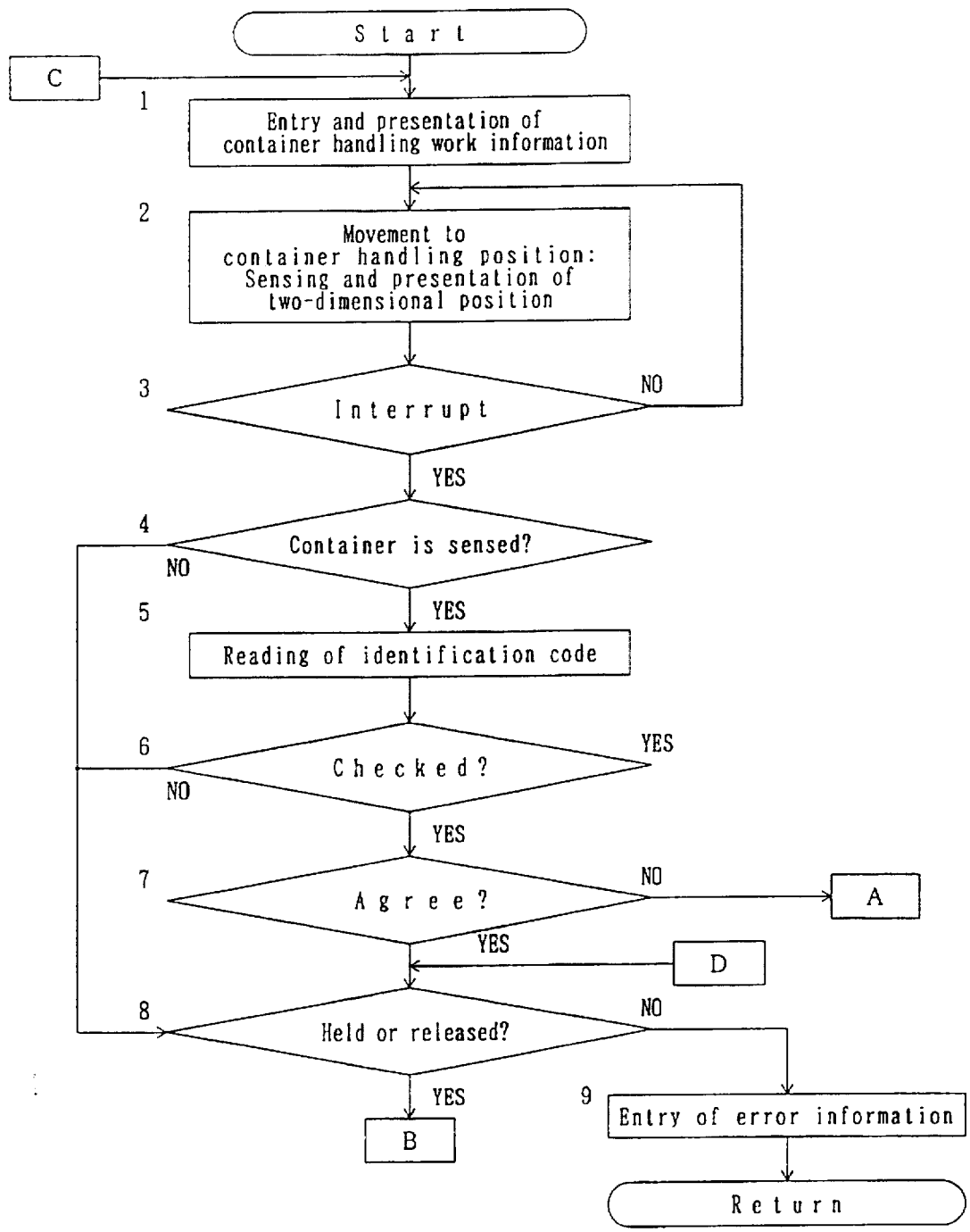
FIGS. 10 through 12 are flow charts showing the information flow during the container handling of the example.
Figure 11:
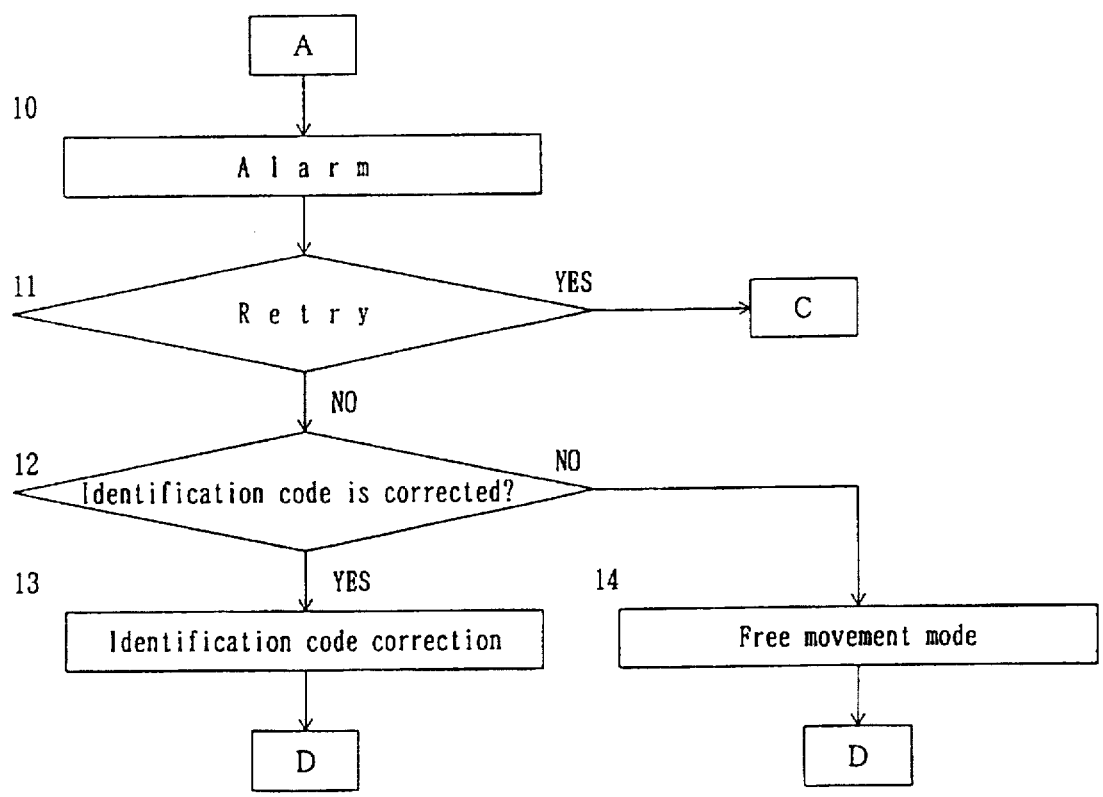
Figure 12:
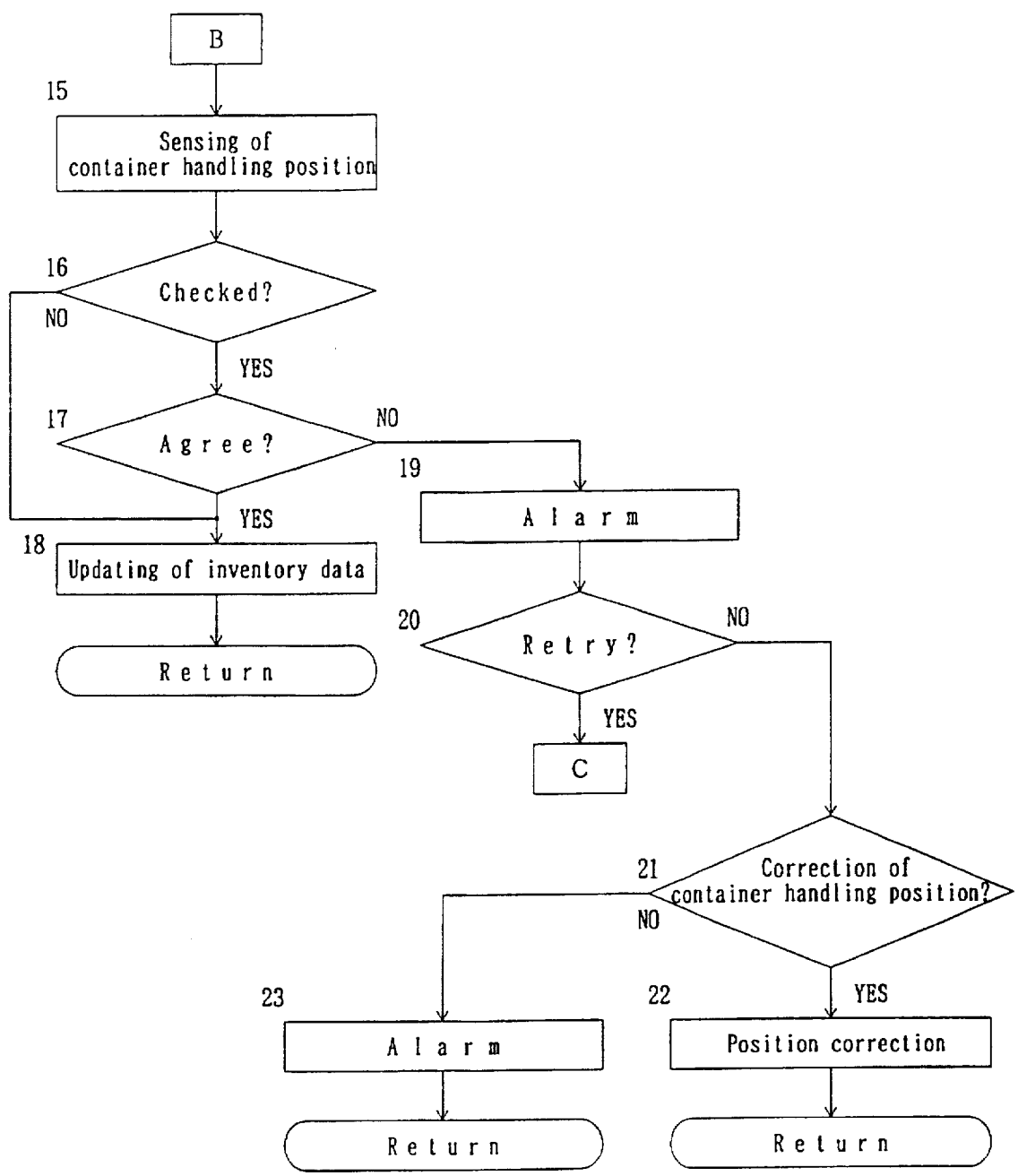

The flow chart of FIGS. 10 through 12 show a subroutine for the container handling in the flow chart of FIG. 9. Also, this flow chart shows the subroutine for the container handling works at both the initial position of the container 2 and the final position of the container 2. Therefore, after container handling work is performed at the initial position according to the subroutine, container handling work is performed at the final position according to the same subroutine. In this container handling work, the container handling work information, whose selection is permitted, is entered in the controller 40 of the container handling apparatus 6, and is presented on the display apparatus 42. The display apparatus 42 also presents a map of the entire container yard or the vicinities of the current position of the container handling apparatus 6 as navigation information (step 1). If container handling work is performed between a truck 4 and a container handling apparatus 6, the truck lane on which the truck 4 waits, the identification code 62 of the container 2, and the stocking position of the container 2 in the container yard 1 constitute the container handling work information. If a number card 103 for identification of the truck 4, or the like, is placed on the roof of the operator's cab of the truck 4, or elsewhere, the identification number is also entered in the controller 40 as a part of the container handling work information. If the container handling work is performed between a vessel 5 and a container handling apparatus 6, the position of the container handling by a gantry crane 7, the identification code 62 of the container 2, and the preset stocking position in the container yard 1 constitute the container handling work information. In the case of martialing, the handling position of the container 2 by the gantry crane 7 relative to the vessel 5 constitutes the container handling work information.

Next, the horizontal two-dimensional position of the container handling apparatus 6 is continuously sensed on a real-time basis as it moves. The sensed two-dimensional position is additionally presented on the navigation display of the display apparatus 42 (step 2). The container handling apparatus 6 moves to the container handling position entered by referring to the navigation information, i.e., a truck waiting lane, a container handling position, or a position where the container is handled by the gantry crane 7. The sensed two-dimensional position may be transmitted to the controller 44 of the main management room 46.

Next, the controller 40 determines whether interrupt entry is made or not (step 3). The interrupt can be entered in the controller 40 by, for example, a starting switch for the vertical movement of the spreader 14. If interrupt entry is made, the controller 40 determines whether the container 2 is sensed by the sensor 60 or not (step 4). Upon sensing of the container 2 by the sensor 60, the container identification code 62 is read in the controller 40 by the image pickup apparatus 61 (step 5). Next, the controller 40 determines whether the read container identification code 62 must be checked or not (step 6). In all cases except for free movement mode, checking is made against the identification code 62 of the container 2 scheduled to be carried in, or scheduled to be carried out from, the container yard (step 7). If a correct checking result is obtained, the controller 40 determines whether the container 2 is held or released or not, on the basis of entry of a container holding signal, or releasing signal, from the operating apparatus 21a of the container holding claw 21 (step 8). If the container 2 is not sensed in step 4 because the container handling apparatus 6 already holds another container 2, and if checking is not performed because of free movement in step 6, the controller 40 determines whether the container 2 is held or released or not. If the container 2 is not held or released, some abnormality is assumed, so that error information is entered (step 9). On the basis of the error information, judgement as to whether selection of a new container handling work is permitted in the flow chart of FIG. 9 or not, and instruction as to supplementary work are given.

If an incorrect checking result is obtained in step 7, an alarm is generated (step 10), and judgment is made as to whether the container handling work is retried or not (step 11). If the container handling work is retried, step 1 is performed again. If the container handling work is not retried, judgment is made as to whether the entered container identification code 62 is corrected or not (step 12). If the container identification code 62 is incorrect due to an error in the inventory data or in the container handling work plan, or the like, the entered container identification code 62 is corrected (step 13), and step 8 is performed again. If the entered container identification code 62 is not corrected, the mode is changed to the free movement mode (step 14), and step 8 is performed again.

If the container 2 was held or released in step 8, the position where the container was held or released is sensed on the basis of both the horizontal two-dimensional position of the container handling apparatus 6 and the vertical shifting distance of the container 2 (step 15). Next, judgment is made as to whether the sensed container handling position must be checked or not (step 16). In all cases except for the free movement mode and except for the mode in which the container 2 is carried in a random stocking position, the sensed position is checked against the handling position of the container 2 scheduled to be carried in, or scheduled to be carried out from, the container yard (step 17). If a correct checking result is obtained, or no checking is made, the controller 40 of the container handling apparatus 6 updates the inventory data on the basis of the read container identification code 62 and the sensed container position (step 18). The updated result is transmitted to the controller 44 of the main management room 46 via radio communication apparatuses 43 and 47.

If an incorrect checking result is obtained in step 17, an alarm is generated (step 19), and judgment is made as to whether the container handling work is retried or not (step 20). If the container handling work is retried, step 1 is performed again. If the container handling work is not retried, judgement is made as to whether the entered container handling position is corrected or not (step 21). If the container handling position is incorrect due to an error in the inventory data or in the container handling work plan, or the like, the entered container handling position is corrected (step 22). If the entered container handling position is not corrected, an alarm is generated (step 23). On the basis of the alarm, judgment is made as to whether selection of a new container handling work is permitted in the flow chart of FIG. 9 or not, and instruction as to supplementary work are given.

Figure 13:
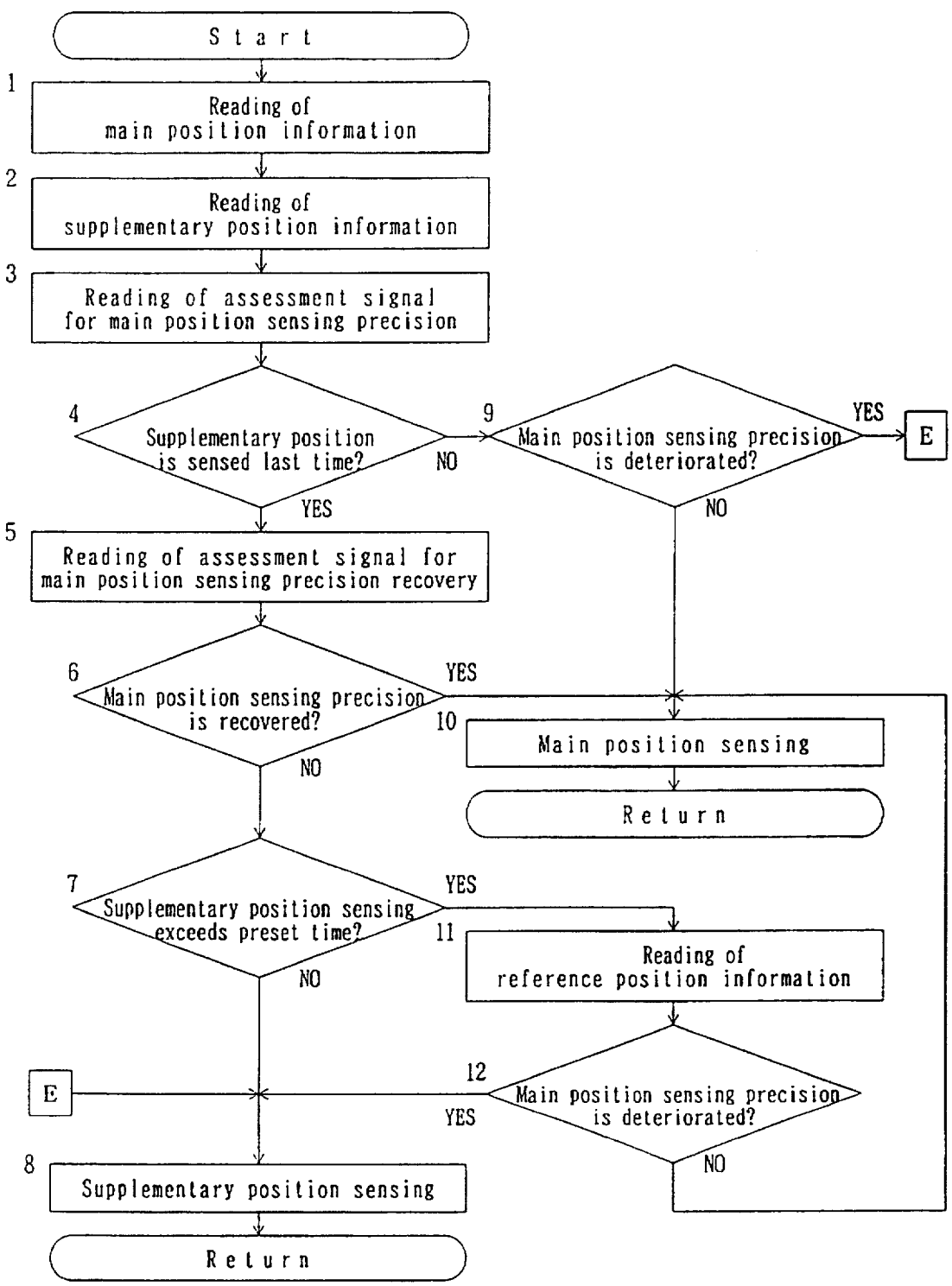
FIG. 13 is a flow chart showing the position sensing procedures of the example.
Figure 14:
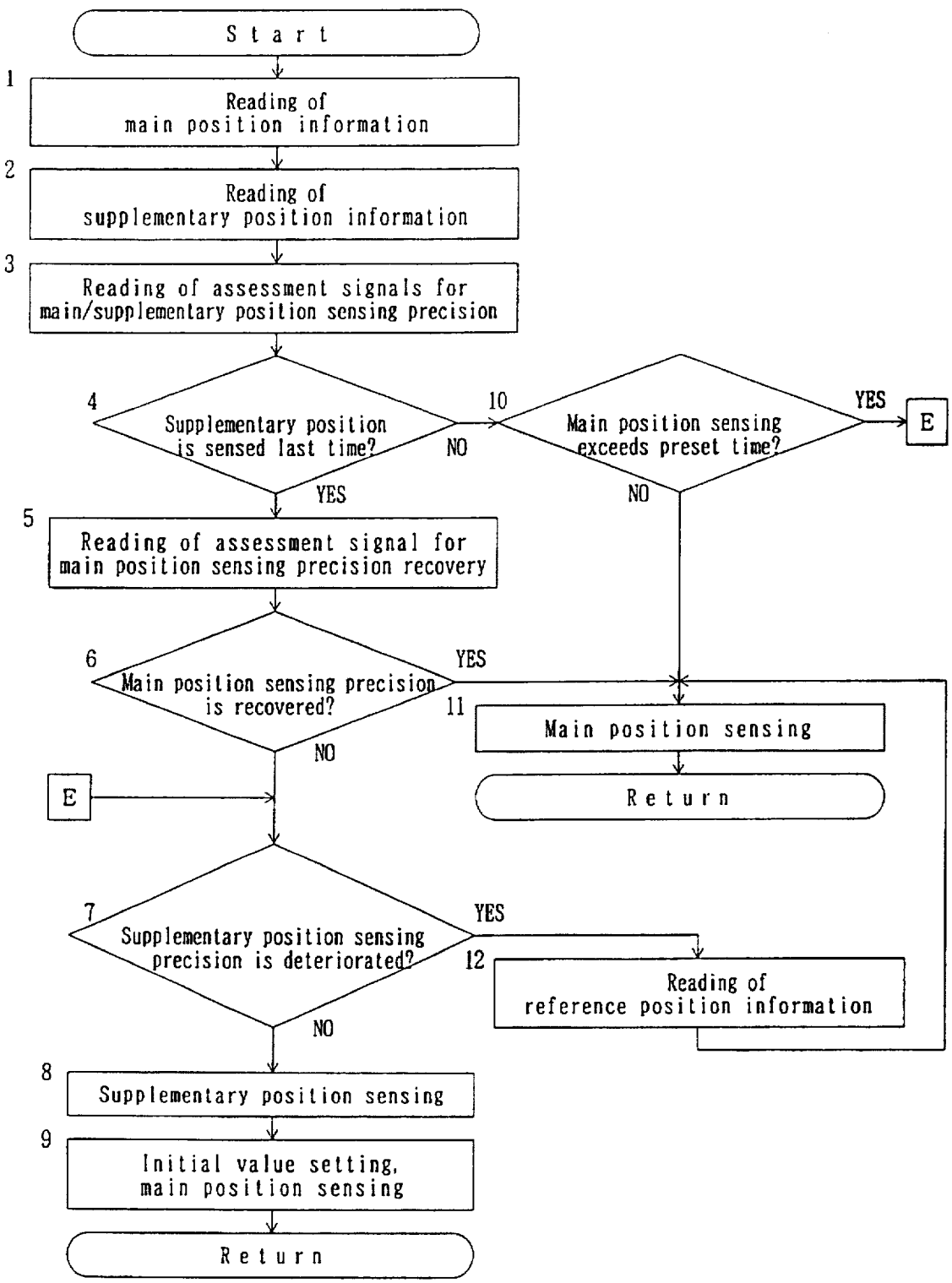
FIG. 14 is another flow chart showing the position sensing procedures of the example.

In the flow charts of FIGS. 10 through 12, the horizontal two-dimensional position of the container handling apparatus 6 can be sensed by the subroutine shown by the flow chart of FIG. 13 or the subroutine shown by the flow chart of FIG. 14.

The flow chart of FIG. 13 shows a subroutine for sensing the horizontal two-dimensional position of the container handling apparatus 6. This flow chart of FIG. 13 corresponds to the case in which the position of the container handling apparatus 6 is sensed mainly by the horizontal position sensing means, i.e., the DGPS, and the position sensing is supplemented by the second horizontal position sensing means when the DGPS fails in position sensing precision.

First, the main two-dimensional position information obtained by the DGPS is read in the controller 40 of the container handling apparatus 6 (step 1). Next, the supplementary two-dimensional position information obtained by the second horizontal position sensing means is read in the controller 40 of the container handling apparatus 6 (step 2). Next, an assessment signal of the precision in the two-dimensional position sensing by the DGPS is read in the controller 40 of the container handling apparatus 6 (step 3). The assessment signal is a signal corresponding to, for example, the number of artificial satellites from which signals can be received, the degree of dispersion of the plural artificial satellites, the presence or absence of the error correction signal from the reference station, or the like.

Next, the controller 40 determines whether the horizontal two-dimensional position of the container handling apparatus 6 was sensed by the second horizontal position sensing means at the last time or not (step 4). If the position sensing at the last time was performed by the second horizontal position sensing means, the controller reads the assessment signal as to whether the precision in the two-dimensional position sensing by the DGPS has been recovered or not (step 5). The assessment signal is a signal corresponding to, for example, the number of artificial satellites from which signals can be received, the degree of dispersion of the plural artificial satellites, the presence or absence of the error correction signal from the reference station, or the like.

Next, judgment is made as to whether the precision in position sensing by the DGPS has been recovered or not (step 6). On the basis of the assessment signal, the precision is judged to be recovered, if the possibility of deterioration of the sensing precision of the DGPS is low. If the possibility of deterioration of the sensing precision of the DGPS is high, the precision is judged not to be recovered. If the possibility of deterioration of the sensing precision of the DGPS is neither high nor low, the precision may be judged recovered with an alarm to give a caution. If the position sensing precision of the DGPS has not been recovered, judgment is made as to whether the position sensing by the second horizontal position sensing means exceeds the preset time or not (step 7). If the preset time is not exceeded, the horizontal two-dimensional position of the container handling apparatus 6 is sensed by the second horizontal position sensing means (step 8).

In step 4, if the position sensing was not performed by the second horizontal position sensing means, judgment is made as to whether the precision in sensing by the DGPS has been deteriorated or not (step 9). On the basis of the precision assessment signal read in step 3, the precision is judged to be normal, if the possibility of deterioration of the sensing precision of the DGPS is low. If the possibility of deterioration of the sensing precision of the DGPS is high, or if it is evident that the two-dimensional position cannot be accurately because the number of artificial satellites, from which signals can be received, is not more than 2 and so on, the precision is judged to be deteriorated on the basis of the signal. If the possibility of deterioration of the sensing precision of the DGPS is neither high nor low, the two-dimensional position may be determined by the second horizontal position sensing means based on the two-dimensional position determined by the DGPS at the last time, and then, the difference may be calculated between the two-dimensional position determined by the second horizontal position sensing means and the current two-dimensional position determined by the DGPS. If the difference exceeds a preset value, the precision can be judged to be deteriorated, and if not so, the precision can be adjudged to be normal. The possibility of deterioration of the sensing precision of the DGPS may be assessed on the basis of the relationship between the experimentally obtained data of the two-dimensional position sensed by the DGPS and the number of artificial satellites from which signal can be received, the degree of dispersion of the plural artificial satellites, the presence or absence of the error correction signal from the reference station, or the like.

In step 9, if the sensing precision of the DGPS is deteriorated, the horizontal two-dimensional position of the container handling apparatus 6 is sensed by the second horizontal position sensing means in step 8. If the sensing precision of the DGPS is recovered in step 6, and if the sensing precision of the DGPS is not deteriorated in step 9, the horizontal two-dimensional position of the container handling apparatus 6 is sensed by the DGPS (step 10). In step 7, if the position sensing by the second horizontal position sensing means exceeds the preset time, both the precision of the DGPS and the precision of the second horizontal position sensing means are in a failure. In this case, the reference position information is read as stated above (step 11) to recover the position sensing precision of the second horizontal position sensing means. Judgment is then made as to whether the sensing precision of the DGPS is deteriorated or not (step 12); if the precision is deteriorated, the horizontal two-dimensional position of the container handling apparatus 6 is sensed by the second horizontal position sensing means, by using the reference position information as the initial value. In step 12, if the sensing precision of the DGPS is not deteriorated, the horizontal two-dimensional position of the container handling apparatus 6 is sensed by the DGPS in step 10.

The flow chart of FIG. 14 shows a subroutine for sensing the horizontal two-dimensional position of the container handling apparatus 6. This flow chart of FIG. 14 corresponds to the case in which the position of the container handling apparatus 6 is sensed mainly by the second horizontal position sensing means, and the position sensing is supplemented by the first horizontal position sensing means, i.e., the DGPS when the second horizontal position sensing means fails is position sensing precision.

First, the main two-dimensional position information obtained by the second horizontal position sensing means is read in the controller 40 of the container handling apparatus 6 (step 1). Next, the supplementary two-dimensional position information obtained by the DGPS is read in the controller 40 of the container handling apparatus 6 (step 2). Next, the assessment signal of the precision in the two-dimensional position sensing by the second horizontal position sensing means, and the assessment signal of the precision in the two-dimensional position sensing by the DGPS are read in the controller 40 of the container handling apparatus 6 (step 3). The assessment signal of the precision in the two-dimensional position sensing by the second horizontal position sensing means is a signal corresponding to, for example, the difference between the two-dimensional position obtained by the second horizontal position sensing means and the two-dimensional position obtained by the DGPS. If the difference exceeds a preset value, the precision is judged to be deteriorated; if the difference is below the present value, the precision can be judged not to be deteriorated. The assessment signal of the precision in the two-dimensional position sensing by the DGPS is a signal corresponding to, for example, the number of artificial satellites from which signals can be received, the degree of dispersion of the plural artificial satellites, the presence or absence of the error correction signal from the reference station, or the like.

Next, the controller 40 determines whether the horizontal two-dimensional position of the container handling apparatus 6 was sensed by the DGPS at the last time or not (step 4). If the position sensing at the last time was performed by the DGPS, the controller reads the assessment signal as to whether the precision in two-dimensional position sensing by the second horizontal position sensing means has been recovered or not (step 5). The assessment signal is a signal corresponding to, for example, the difference between the two-dimensional position determined by the second horizontal position sensing means and the two-dimensional position determined by the DGPS. If the difference exceeds a preset value, the precision is judged not to be recovered; if the difference is below the preset value, the precision can be judged to be recovered.

Next, judgment is made as to whether the precision in position sensing by the second horizontal position sensing means has been recovered or not (step 6). If the precision of the second horizontal position sensing means has not been recovered, judgment is made as to whether the precision in position sensing by the DGPS has been deteriorated or not (step 7). If the precision in position sensing by the DGPS has not been deteriorated, the horizontal two-dimensional position of the container handling apparatus 6 is sensed by the DGPS (step 8). By using the position sensed by the DGPS as the initial value, the horizontal two-dimensional position of the container handling apparatus 6 is sensed by the second horizontal position sensing means (step 9).

In step 4, if the position sensing at the last time was not performed by the DGPS, judgment is made as to whether the position sensing by the second horizontal position sensing means exceeds the preset time or not (step 10). If the preset time is not exceeded, the horizontal two-dimensional position of the container handling apparatus 6 is sensed by the second horizontal position sensing means (step 11).

In step 10, if the position sensing by the second horizontal position sensing means exceeds the preset time, judgment is made as to whether the precision in position sensing by the DGPS has been deteriorated or not in step 7. If the precision in position sensing by the DGPS has been deteriorated, the reference position information is read (step 12), so that the precision in position sensing by the second horizontal position sensing means is recovered, and step 11 is performed again.

Figure 15:
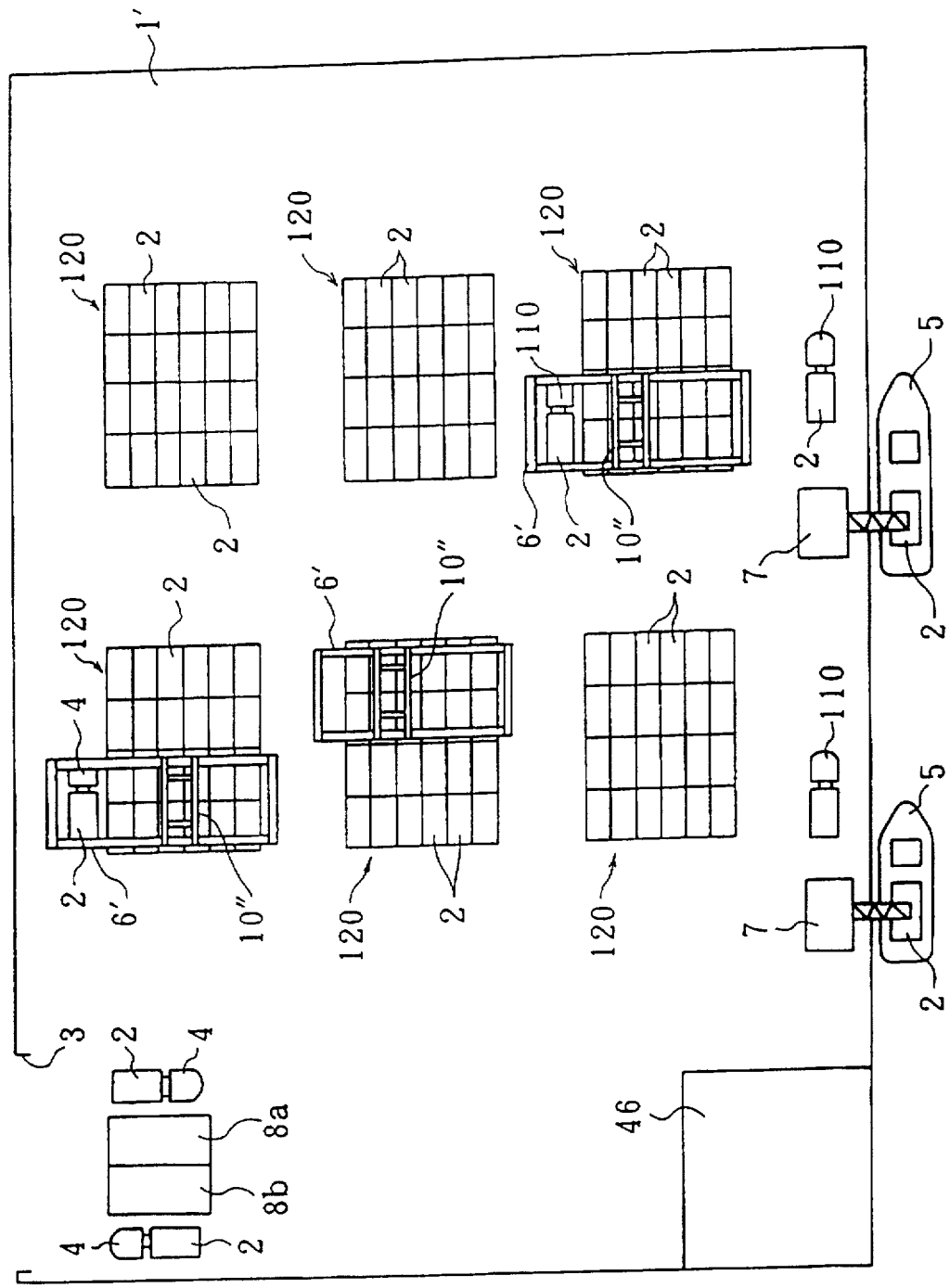
FIG. 15 illustrates the layout of the container yard of a modification.
Figure 16:
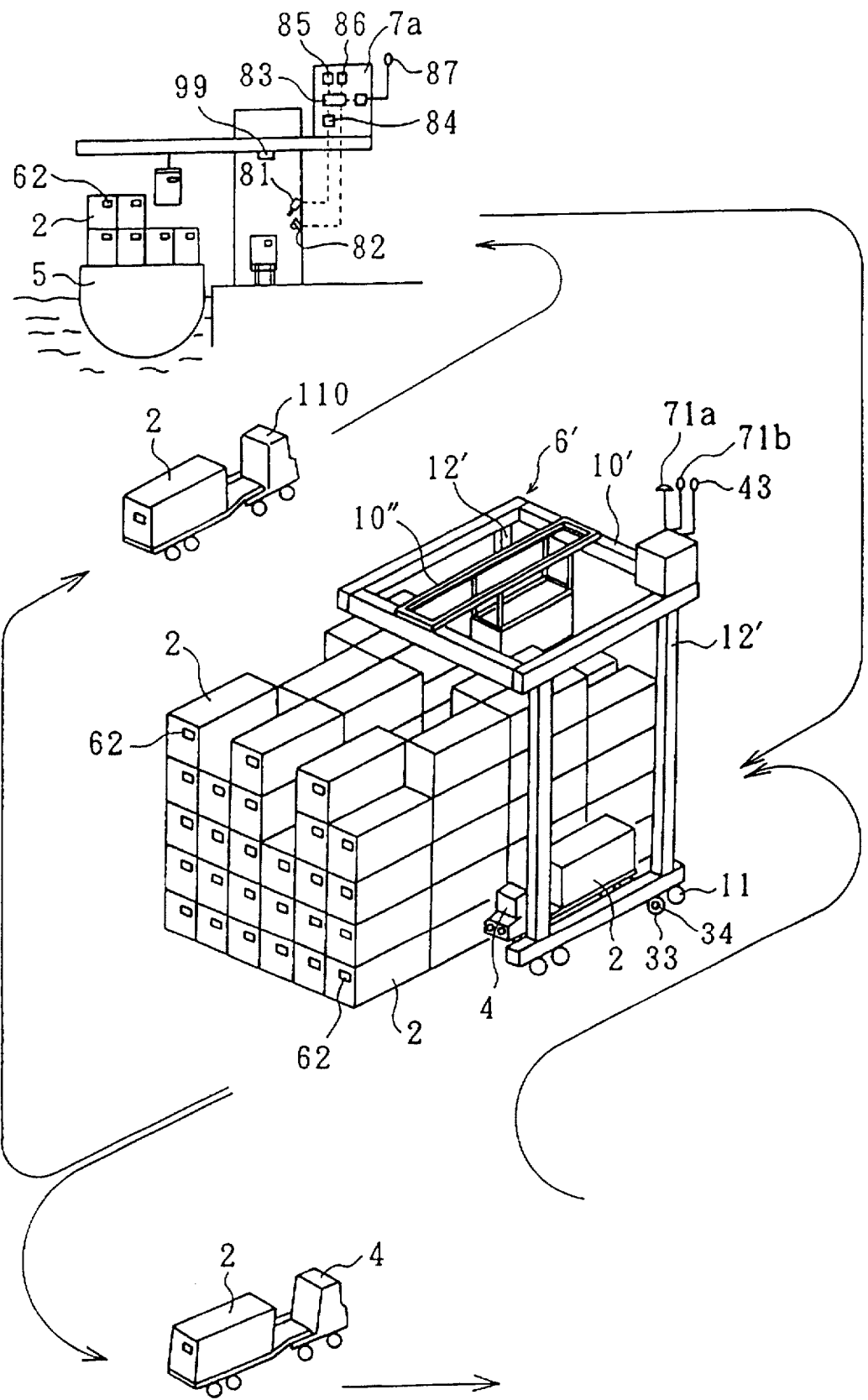
FIG. 16 illustrates the configuration of the container yard of the modification.

FIGS. 15 and 16 show a modification of the above-described example. The present modification differs from the above-described example as follows. In the above-described example, the container yard 1 has plural stocking lanes on each of which containers 2 are stocked in a row. In the modification, the container yard 1' has a plural stocking areas 120 in each of which containers 2 are stocked in plural rows. In the modification, a self-propelled container handling apparatus 6' of the transfer crane type is used in place of the container handling apparatus 6 of the straddle carrier type used in the above-described example. The interval of the masts 12' constituting the body 10' of the container handling apparatus 6' is wider than the stocking width of each stocking area 120 of the containers 2. Also, the container handling apparatus 6' is equipped with a shifting apparatus having a self-propelled frame 10" provided in the body 10' so that the frame 10" can move along the direction of the body's width, to horizontally shift the container 2 without propelling of the container handling apparatus 6" itself. The self-propelled frame 10" is provided with a lift for vertically shifting the container 2. The horizontal two-dimensional position of the container 2 handled by the container handling apparatus 6' is determined by the controller 40, which combines the position of the container handling apparatus 6' determined by the first or second horizontal position sensing means in the same manner as in the above-described example with the two-dimensional position of the container 2 determined by an additional horizontal position sensing means on the basis of sensing of the horizontal shifting distance of the container 2 shifted by the shifting apparatus. The additional horizontal position sensing means determines the two-dimensional position of the container 2 by setting a zero point of the self-propelled frame 10" relative to the body 10', attaching an encoder for outputting a signal according to the rotation of the driving motor of the self-propelled frame 10", and calculating the shifting distance of the self-propelled frame 10" from the zero point on the basis of the encoder signal by the controller 40. In the container yard 1 of the above-described example, a truck lane is provided as a container handling site between a truck 4 and the container handling apparatus 6; in the present modification, the space between the masts 12' of the container handling apparatus 6' and the container 2 is a container handling site between a truck 4 and the container handling apparatus 6'. In the container yard 1 of the above-described example, shifting of the container 2 between the container stocking site and the gantry crane 7 is performed by the container handling apparatus 6; in the present modification, a truck type carrier 110 is used which moves within the container yard 1'. The containers handling between the carrier 110 and the container handling apparatus 6' is performed. The other aspects are the same as in the above-described example; the same portions are shown with the same symbols.

The present invention is not limited to the above-described example or modification. For example, although the identification code borne on an end face of the container 2 is read in the above-described example, the identification code borne on a portion other than the end face of the container 2, such as the upper face, may be read. Also, the procedure for container handling work described in the above-described example is merely an exemplification, and is not limitative. As a container handling apparatus, a fork lift truck type apparatus or a radio-controlled unmanned car, for instance, may be used.

INDUSTRIAL APPLICABILITY

The container handling apparatus and management system according to the present invention are suitable to the handling and management of containers in a container yard.

What is claimed is:

1. A self-propelled container handling apparatus for handling a container in a container yard, comprising:

means for reading a container identification code borne on the container;

a lift capable of vertically shifting the container so that the container can be stacked;

a horizontal position sensing means for sensing a horizontal two-dimensional position of the container, on the basis of sensing of a position of the container handling apparatus itself by signals from artificial satellites;

a vertical position sensing means for sensing a vertical position of the container, on the basis of sensing of a vertical shifting distance of the container vertically shifted by the lift;

means for assessing the position sensing precision of the horizontal position sensing means; and a second horizontal position sensing means for sensing the horizontal two-dimensional position of the container, on the basis of sensing of the position of the container handling apparatus itself; wherein this self-propelled container handling apparatus can sense the stocking position of the container to be carried at the container yard and read the identification code of the container at the stocking position in the container yard; wherein the position of the container handling apparatus itself can be sensed by the second horizontal position sensing means, when the first horizontal position sensing means fails in the position sensing precision; wherein the second horizontal position sensing means senses the position of the container handling apparatus itself, by using an azimuth sensor and a self-propelling distance sensing apparatus provided in the container handling apparatus itself; wherein means for assessing the position sensing precision of the second horizontal position sensing means is provided, this means assesses the precision on the basis of whether the position sensing time exceeds a preset time or not; and wherein the second horizontal position sensing means can sense the position of the container handling apparatus itself, by using a reference position information readable at a known reference position as an initial value, when both the first horizontal position sensing means and the second horizontal position sensing means fail in position sensing precision.

2. A self-propelled container handling apparatus for handling a container in a container yard, comprising:

means for reading a container identification code borne on the container;

a lift capable of vertically shifting the container so that the container can be stacked;

a shifting apparatus for horizontally shifting the container without propelling the container handling apparatus itself;

a horizontal position sensing means for sensing a horizontal two-dimensional position of the container, on the basis of sensing of a position of the container handling apparatus itself by signals from artificial satellites;

an additional horizontal position sensing means for sensing the horizontal two-dimensional position of the container, on the basis of sensing of a horizontal shifting distance of the container shifted by the shifting apparatus;

a vertical position sensing means for sensing a vertical position of the container, on the basis of sensing of a vertical shifting distance of the container vertically shifted by the lift;

means for assessing the position sensing precision of the horizontal position sensing means; and a second horizontal position sensing means for sensing the horizontal two-dimensional position of the container, on the basis of sensing of the position of the container handling apparatus itself; wherein this self-propelled container handling apparatus can sense the stocking position of the container to be carried at the container yard and read the identification code of the container at the stocking position in the container yard; wherein the position of the container handling apparatus itself can be sensed by the second horizontal position sensing means, when the first horizontal position sensing means fails in the position sensing precision; wherein the second horizontal position sensing means senses the position of the container handling apparatus itself, by using an azimuth sensor and a self-propelling distance sensing apparatus provided in the container handling apparatus itself; wherein means for assessing the position sensing precision of the second horizontal position sensing means is provided, this means assesses the precision on the basis of whether the position sensing time exceeds a preset time or not; and wherein the second horizontal position sensing means can sense the position of the container handling apparatus itself, by using a reference position information readable at a known reference position as an initial value, when both the first horizontal position sensing means and the second horizontal position sensing means fail in position sensing precision.

3. A self-propelled container handling apparatus for handling a container in a container yard, comprising:

means for reading a container identification code borne on the container;

a lift capable of vertically shifting the container so that the container can be stacked;

a horizontal position sensing means for sensing a horizontal two-dimensional position of the container, on the basis of sensing of a position of the container handling apparatus itself by signals from artificial satellites;

a vertical position sensing means for sensing a vertical position of the container, on the basis of sensing of a vertical shifting distance of the container vertically shifted by the lift;

a second horizontal position sensing means for sensing the horizontal two-dimensional position of the container, on the basis of sensing of the position of the container handling apparatus itself; and means for assessing the position sensing precision of the second horizontal position sensing means; wherein this self-propelled container handling apparatus can sense the stocking position of the container to be carried at the container yard and read the identification code of the container at the stocking position in the container yard; wherein the position of the container handling apparatus itself can be sensed by the second horizontal position sensing means, when the first horizontal position sensing means fails in the position sensing precision; wherein the second horizontal position sensing means senses the position of the container handling apparatus itself, by using an azimuth sensor and a self-propelling distance sensing apparatus provided in the container handling apparatus itself; wherein the position sensing precision of the second horizontal position sensing means is assessed on the basis of whether the position sensing time exceeds a preset time or not; wherein means for assessing the position sensing precision of the first horizontal position sensing means is provided; and wherein the second horizontal position sensing means can sense the position of the container handling apparatus itself, by using a reference position information readable at a known reference position as an initial value, when both the first horizontal position sensing means and the second horizontal position sensing means fail in position sensing precision.

4. A self-propelled container handling apparatus for handling a container in a container yard, comprising:

means for reading a container identification code borne on the container;

a lift capable of vertically shifting the container so that the container can be stacked;

a shifting apparatus for horizontally shifting the container without propelling the container handling apparatus itself;

a horizontal position sensing means for sensing a horizontal two-dimensional position of the container, on the basis of sensing of a position of the container handling apparatus itself by signals from artificial satellites;

an additional horizontal position sensing means for sensing the horizontal two-dimensional position of the container, on the basis of sensing of a horizontal shifting distance of the container shifted by the shifting apparatus;

a vertical position sensing means for sensing a vertical position of the container, on the basis of sensing of a vertical shifting distance of the container vertically shifted by the lift;

a second horizontal position sensing means for sensing the horizontal two-dimensional position of the container, on the basis of sensing of the position of the container handling apparatus itself; and means for assessing the position sensing precision of the second horizontal position sensing means; wherein this self-propelled container handling apparatus can sense the stocking position of the container to be carried at the container yard and read the identification code of the container at the stocking position in the container yard; wherein the position of the container handling apparatus itself can be sensed by the second horizontal position sensing means, when the first horizontal position sensing means fails in the position sensing precision; wherein the second horizontal position sensing means senses the position of the container handling apparatus itself, by using an azimuth sensor and a self-propelling distance sensing apparatus provided in the container handling apparatus itself; wherein the position sensing precision of the second horizontal position sensing means is assessed on the basis of whether the position sensing time exceeds a preset time or not; wherein:

means for assessing the position sensing precision of the first horizontal position sensing means is provided; and wherein the second horizontal position sensing means can sense the position of the container handling apparatus itself, by using a reference position information readable at a known reference position as an initial value, when both the first horizontal position sensing means and the second horizontal position sensing means fail in position sensing precision.

5. The container handling apparatus according to claim 1, wherein the horizontal position sensing means is a DGPS.

6. The container handling apparatus according to claim 1, wherein the means for reading the container identification code has an image pickup apparatus capable of taking an image of the container identification code, and an image processor capable of recognizing the container identification code by an image signal transmitted from the image pickup apparatus.

7. The container handling apparatus according to claim 6, wherein the means for reading the container identification code has a sensor capable of sensing the container, and a controller for outputting an image pickup instruction signal to the image pickup apparatus upon entry of a container sensing signal from the sensor.

8. A container management system comprising:

the container handling apparatus according to claim 1; means for storing identification codes and stocking positions of containers stocked in the container yard as inventory data; and means for updating the inventory data on the basis of both the container identification code read by the container handling apparatus and the container position sensed by the container handling apparatus, at the time of container handling by the container handling apparatus.

9. The container management system according to claim 8, comprising: means for entering the identification code and handling position of the container to be handled by the container handling apparatus; means for checking the entered container identification code and the handling position against the container identification code read by the container handling apparatus and the container position sensed by the container handling apparatus; and means for outputting the checking result.

10. The container management system according to claim 8, comprising: means for storing an identification code of a container scheduled to be carried in the container yard, and an identification code of a container scheduled to be carried out from the container yard; means for reading the identification code of the container carried in the container yard before it is read by the container handling apparatus; means for reading the identification code of the container carried out from the container yard after it is read by the container handling apparatus; means for checking the identification code of the container scheduled to be carried in the container yard against the container identification code read at the time when the container is carried in the container yard, and for checking the identification code of the container scheduled to be carried out from the container yard against the container identification code read at the time when the container is carried out from the container yard; and means for outputting the checking result.

11. The container handling apparatus according to claim 2, wherein the horizontal position sensing means is a DGPS.

12. The container handling apparatus according to claim 3, wherein the horizontal position sensing means is a DGPS.

13. The container handling apparatus according to claim 4, wherein the horizontal position sensing means is a DGPS.

14. The container handling apparatus according to claim 2, wherein the means for reading the container identification code has an image pickup apparatus capable of taking an image of the container identification code, and an image processor capable of recognizing the container identification code by an image signal transmitted from the image pickup apparatus.

15. The container handling apparatus according to claim 3, wherein the means for reading the container identification code has an image pickup apparatus capable of taking an image of the container identification code, and an image processor capable of recognizing the container identification code by an image signal transmitted from the image pickup apparatus.

16. The container handling apparatus according to claim 4, wherein the means for reading the container identification code has an image pickup apparatus capable of taking an image of the container identification code, and an image processor capable of recognizing the container identification code by an image signal transmitted from the image pickup apparatus.

17. A container management system comprising:

the container handling apparatus according to claim 2; means for storing identification codes and stocking positions of containers stocked in the container yard as inventory data; and means for updating the inventory data on the basis of both the container identification code read by the container handling apparatus and the container position sensed by the container handling apparatus, at the time of container handling by the container handling apparatus.

18. A container management system comprising:

the container handling apparatus according to claim 3; means for storing identification codes and stocking positions of containers stocked in the container yard as inventory data; and means for updating the inventory data on the basis of both the container identification code read by the container handling apparatus and the container position sensed by the container handling apparatus, at the time of container handling by the container handling apparatus.

19. A container management system comprising:

the container handling apparatus according to claim 4; means for storing identification codes and stocking positions of containers stocked in the container yard as inventory data; and means for updating the inventory data on the basis of both the container identification code read by the container handling apparatus and the container position sensed by the container handling apparatus, at the time of container handling by the container handling apparatus.

* * * * *